US009928929B2

(12) United States Patent
Ardavan et al.

(10) Patent No.: US 9,928,929 B2
(45) Date of Patent: Mar. 27, 2018

(54) APPARATUS FOR GENERATING FOCUSED ELECTROMAGNETIC RADIATION

(71) Applicant: OXBRIDGE PULSAR SOURCES LIMITED, Cambridge (GB)

(72) Inventors: Arzhang Ardavan, Oxford (GB); Houshang Ardavan, Cambridge (GB)

(73) Assignee: OXBRIDGE PULSAR SOURCES LIMITED, Cambridge (GB)

( * ) Notice: Subject to any disclaimer, the term of this patent is extended or adjusted under 35 U.S.C. 154(b) by 0 days.

(21) Appl. No.: 15/489,160

(22) Filed: Apr. 17, 2017

(65) Prior Publication Data

US 2017/0323697 A1 Nov. 9, 2017

Related U.S. Application Data

(63) Continuation of application No. 11/389,183, filed on Mar. 27, 2006, now Pat. No. 9,633,754, which is a continuation of application No. 09/786,507, filed as application No. PCT/GB99/02943 on Sep. 6, 1999, now abandoned.

(51) Int. Cl.

| | |
|---|---|
| ***H01Q 1/00*** | (2006.01) |
| ***H01Q 3/22*** | (2006.01) |
| ***H01Q 13/00*** | (2006.01) |
| ***G01S 3/80*** | (2006.01) |
| ***G21K 1/00*** | (2006.01) |
| ***G21K 1/16*** | (2006.01) |

(52) U.S. Cl.

CPC ................. *G21K 1/00* (2013.01); *G21K 1/16* (2013.01)

(58) Field of Classification Search

USPC ....... 342/153, 154, 157, 175, 367, 368, 349, 342/365, 363, 370–375, 377, 427, 429; 343/700 MS, 700 R, 711–713, 718, 757, 343/765, 770–772, 776–778, 787, 790, 343/791, 705, 708, 754, 824, 855, 860, 343/859, 866, 872, 873, 900, 905–907, 343/911 R; 333/18, 125, 137, 134, 135, 333/161, 164; 370/310, 400; 359/310, 359/315; 455/12.1, 13.3, 427; 315/503

See application file for complete search history.

(56) References Cited

U.S. PATENT DOCUMENTS 5,166,693 A * 11/1992 Nishikawa ........... H01Q 1/3233 342/354
9,633,754 B2 * 4/2017 Ardavan .................. G21K 1/00

* cited by examiner

*Primary Examiner* — Bernard Souw

(74) *Attorney, Agent, or Firm* — Thomas | Horstemeyer, LLP.

(57) ABSTRACT

An apparatus for generating electromagnetic radiation comprises a polarizable or magnetizable medium. A polarization or magnetisation current can be generated, in a controlled manner, whose distribution pattern has an accelerated motion, so that non-spherically decaying and intense spherically decaying components of electromagnetic radiation can be generated. The coordinated motion of aggregates of charged particles can give rise to extended electric charges and currents. The charged distribution patterns can propagate with a phase speed exceeding the speed of light in vacuo and that, once created, such propagating charged patterns act as sources of electromagnetic fields in precisely the same way as any other moving sources of these fields. That the distribution patterns of these sources travel faster than light is not, of course, in any way incompatible with the requirements of special relativity. The superluminally moving charged pattern is created by the coordinated motion of aggregates of subluminally moving particles.

15 Claims, 11 Drawing Sheets

APPARATUS FOR GENERATING FOCUSED ELECTROMAGNETIC RADIATION

CROSS REFERENCE TO RELATED APPLICATIONS

This application is a continuation of co-pending U.S. application Ser. No. 11/389,183, filed Mar. 27, 2006 and entitled "APPARATUS FOR GENERATING FOCUSED ELECTROMAGNETIC RADIATION," which is a continuation of U.S. application Ser. No. 09/786,507, filed May 1, 2001, which is the U.S. national phase of international application PCT/GB1999/002943, filed 6 Sep. 1999, designating the U.S. and claiming priority from GB 9819504.3, filed 7 Sep. 1998, the entire contents of each of which are hereby incorporated by reference.

DETAILED DESCRIPTION

The present invention relates to the generation of electromagnetic radiation and, more particularly, to an apparatus and method of generating focused pulses of electromagnetic radiation over a wide range of frequencies. More particularly it relates to an apparatus and method for generating pulses of non-spherically decaying electromagnetic radiation.

The present apparatus and method are based on the emission of electromagnetic radiation by rapidly varying polarisation or magnetisation current distributions rather than by conduction or convection electric currents. Such currents can have distribution patterns that move with arbitrary speeds (including speeds exceeding the speed of light in vacuo), and so can radiate more intensely over a much wider range of frequencies than their conventional counterparts. The spectrum of the radiation they generate could extend to frequencies that are by many orders of magnitude higher than the characteristic frequency of the fluctuations of the source itself.

Furthermore, intensities of normal emissions decay at a rate of $R^{-2}$, where R is the distance from the source. It has been noted, however, that the intensities of certain pulses of electromagnetic radiation can decay spatially at a lower rate than that predicted by this inverse square law (see Myers et al., Phys. World, November 1990, p. 39). The new solution of Maxwell's equations set out below, for example, predicts that the electromagnetic radiation emitted from superluminally, circularly moving charged patterns decays at a rate of $R^{-1}$. Another example is the electromagnetic radiation emitted from superluminally, rectilinearly moving charged patterns which decays at a rate of $$R^{-\frac{2}{3}}.$$

This emission process can be exploited, moreover, to generate waves which do not form themselves into a focused pulse until they arrive at their intended destination and which subsequently remain in focus only for an adjustable interval of time.

It will be widely appreciated that being able to employ such emissions for signal transmission, amongst other applications, would have significant commercial value, given that it would enable the employment of lower power transmitters and/or larger transmission ranges, the use of signals that cannot be intercepted by third parties, and the exploitation of higher bandwidth. The near-field component of the radiation in question has many features in common with, and so can be used as an alternative to, synchrotron radiation. The present invention provides a method and apparatus for generating such emissions.

According to the present invention there is provided an apparatus for generating electromagnetic radiation comprising:

a polarizable or magnetizable medium; and means of generating, in a controlled manner, a polarisation or magnetisation current with a rapidly moving, accelerating distribution pattern such that the moving source in question generates electromagnetic radiation.

The speed of the moving distribution pattern may be superluminal so that the apparatus generates both a non-spherically decaying component and an intense spherically decaying component of electromagnetic radiation.

The apparatus may comprise a dielectric substrate, a plurality of electrodes positioned adjacent to the substrate, and the means for applying a voltage to the electrodes sequentially at a rate sufficient to induce a polarised region in the substrate which moves along the substrate with a speed exceeding the speed of light. The dielectric substrate may have either a rectilinear or a circular shape.

The wavelength of the generated electromagnetic radiation may be in any range from the radio to a minimum determined only by the lower limit to the acceleration of the source (potentially optical, ultraviolet or even x-ray).

Examples of the present invention will now be described with reference to the accompanying drawings, in which:

Figure 1:
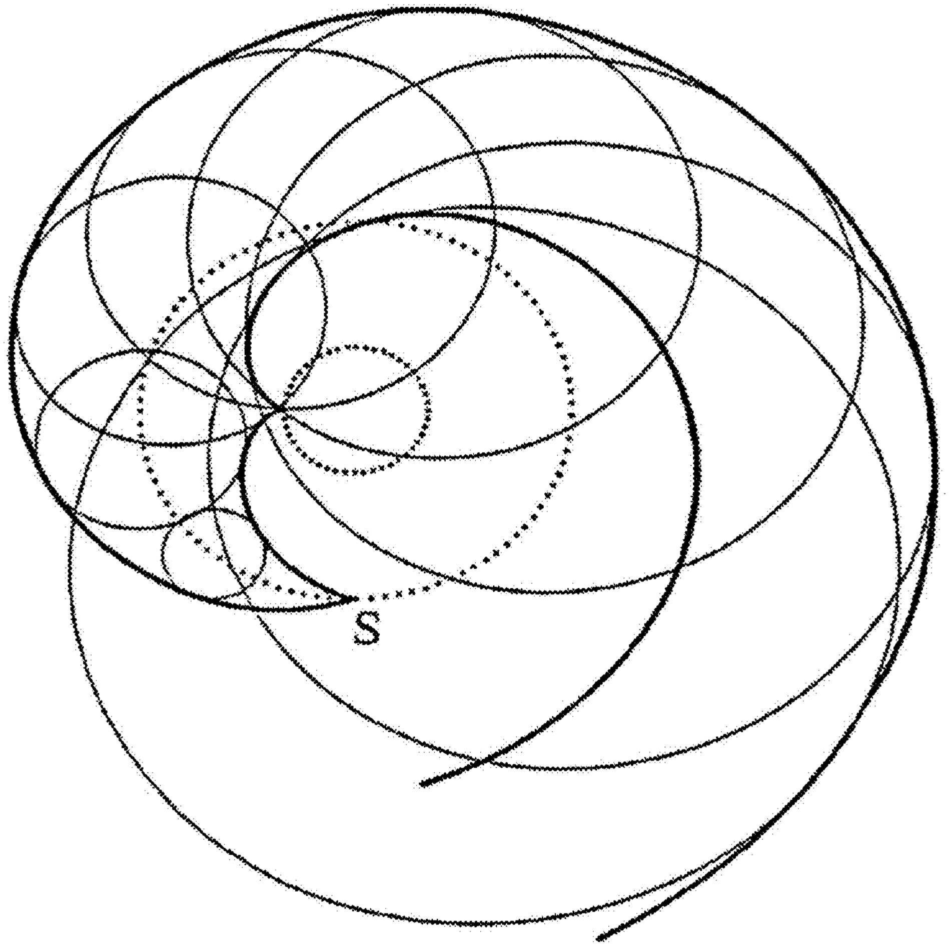
FIG. 1 is a diagram showing the wave fronts of the electromagnetic emission from a particular volume element (source point) S within the circularly moving polarised region of the polarizable medium of the present invention.

Prior to description of the invention, it is appropriate to discuss the principles underlying it.

Bolotovskii and Ginzburg (Soviet Phys. Usp. 15, 184, 1972) and Bolotovskii and Bykov (Sovet Phys. Usp. 33, 477, 1990) have shown that the coordinated motion of aggregates of charged particles can give rise to extended electric charges and currents whose distribution patterns propagate with a phase speed exceeding the speed of light in vacuo and that, once created, such propagating charged patterns act as sources of the electromagnetic fields in precisely the same way as any other moving sources of these fields. That the distribution patterns of these sources travel faster than light is not, of course, in any way incompatible with the requirements of special relativity. The superluminally moving pattern is created by the coordinated motion of aggregates of subluminally moving particles.

We have solved Maxwell's equations for the electromagnetic field that is generated by an extended source distribution pattern of this type in the case where the charged pattern rotates about a fixed axis with a constant angular frequency.

There are solutions of the homogeneous wave equation referred to, inter alia, as non-diffracting radiation beams, focus wave modes or electromagnetic missiles, which describe signals that propagate through space with unexpectedly slow rates of decay or spreading. The potential practical significance of such signals is clearly enormous. The search for physically realizable sources of them, however, has so far remained unsuccessful. Our calculation pinpoints a concrete example of the sources that are currently looked for in this field by establishing a physically tenable inhomogeneous solution of Maxwell's equations with the same characteristics.

Investigation of the present emission process was originally motivated by the observational data on pulsars. The radiation received from these celestial sources of radio waves consists of highly coherent pulses (with as high a brightness temperature as $10^{30}$° K) which recur periodically (with stable periods of the order of 1 sec). The intense magnetic field (~$10^{12}$ G) of the central neutron star in a pulsar affects a coupling between the rotation of this star and that of the distribution pattern of the plasma surrounding it, so that the magnetospheric charges and currents in these objects are of the same type as those described above. The effect responsible for the extreme degree of coherence of the observed emission from pulsars, therefore, may well be the violation of the inverse square law that is here predicted by our calculation.

The present analysis is relevant also to the mathematically similar problem of the generation of acoustic radiation by supersonic propellers and helicopter rotors, although this is not discussed in detail here.

We begin by considering the waves that are emitted by an element of the distribution pattern of the superluminally rotating source from the standpoint of geometrical optics. Next, we calculate the amplitudes of these waves, i.e. the Green's function for the problem, from the retarded potential. We then specify the bifurcation surface of the observer and proceed to calculate the electromagnetic radiation arising from an extended source with a superluminally moving distribution pattern. The singularities of the integrands of the radiation integrals that occur on the bifurcation surface are here handled by means of the theory of generalised functions: the electric and magnetic fields are given by the Hadamard's finite parts of the divergent integrals that result from differentiating the retarded potential under the integral sign. The theory is then concluded with a descriptive account of the analysed emission process in more physical terms, the description of examples of the apparatus, and an outline of the applications of the invention.

I. Envelope of the Wave Fronts and its Cusp

Consider a point source (an element of the propagating distribution pattern of a volume source) which moves on a circle of radius r with the constant angular velocity $\omega\hat{e}_z$, i.e. whose path x(t) is given, in terms of the cylindrical polar coordinates (r,φ,z), by $$r=\text{const.},\ z=\text{const.},\ \varphi=\hat{\varphi}+\omega t, \tag{1}$$

where $\hat{e}_z$ is the basis vector associated with z, and $\hat{\varphi}$ the initial value of φ.

The wave fronts that are emitted by this point source in an empty and unbounded space are described by $$|x_P-x(t)|=c(t_P-t), \tag{2}$$

where the constant c denotes the wave speed, and the coordinates $(x_P, t_P)=(r_P,\varphi_P,z_P,t_P)$ mark the spacetime of observation points. The distance R between the observation point $x_P$ and a source point x is given by $$|x_P-x]\equiv R(\varphi)=[(z_P-z)^2+r_P^2+r^2-2r_Pr\cos(\varphi_P-\varphi)]^{\frac{1}{2}}, \tag{3}$$

so that inserting (1) in (2) we obtain $$R(t)\equiv[(z_P-z)^2+r_P^2+r^2-2r_Pr\cos(\varphi_P-\hat{\varphi}-\omega t)]^{\frac{1}{2}}=c(t_P-t). \tag{4}$$

These wave fronts are expanding spheres of radii $c(t_P-t)$ whose fixed centres $(r_P=r_P,\varphi_P=\hat{\varphi}+\omega t,z_P=z)$ depend on their emission times t (see FIG. 1).

Introducing the natural length scale of the problem, c/ω and using $t_P=(\varphi-\hat{\varphi})/\omega$ to eliminate t in favour of φ, we can express (4) in terms of dimensionless variables as $$g\equiv\varphi-\varphi_P+\hat{R}(\varphi)=\varphi, \tag{5}$$

in which $\hat{R}\equiv R\omega/c$, and $$\varphi\equiv\hat{\varphi}-\hat{\varphi}_P \tag{6}$$

stands for the difference between the positions $\hat{\varphi}=\varphi-\omega t$ of the source point and $\hat{\varphi}_p\equiv\varphi_p-\omega t_p$ of the observation point in the (r, $\hat{\varphi}$, z)-space. The Lagrangian coordinate $\hat{\varphi}$ in (5) lies within an interval of length 2π (e.g. $-\pi<\hat{\varphi}\leq\pi$), while the angle φ, which denotes the azimuthal position of the source point at the retarded time t, ranges over (−∞, ∞).

FIG. 1 depicts the wave fronts described by (5) for fixed values of $(r,\hat{\varphi},z)$ and of φ (or $t_p$), and a discrete set of values of φ (or t). [In this figure, the heavier curves show the cross section of the envelope with the plane of the orbit of the source distribution pattern. The larger of the two dotted circles designates the orbit (at r=3c/ω) and the smaller the light cylinder ($r_p$=c/ω).]

Figure 2:
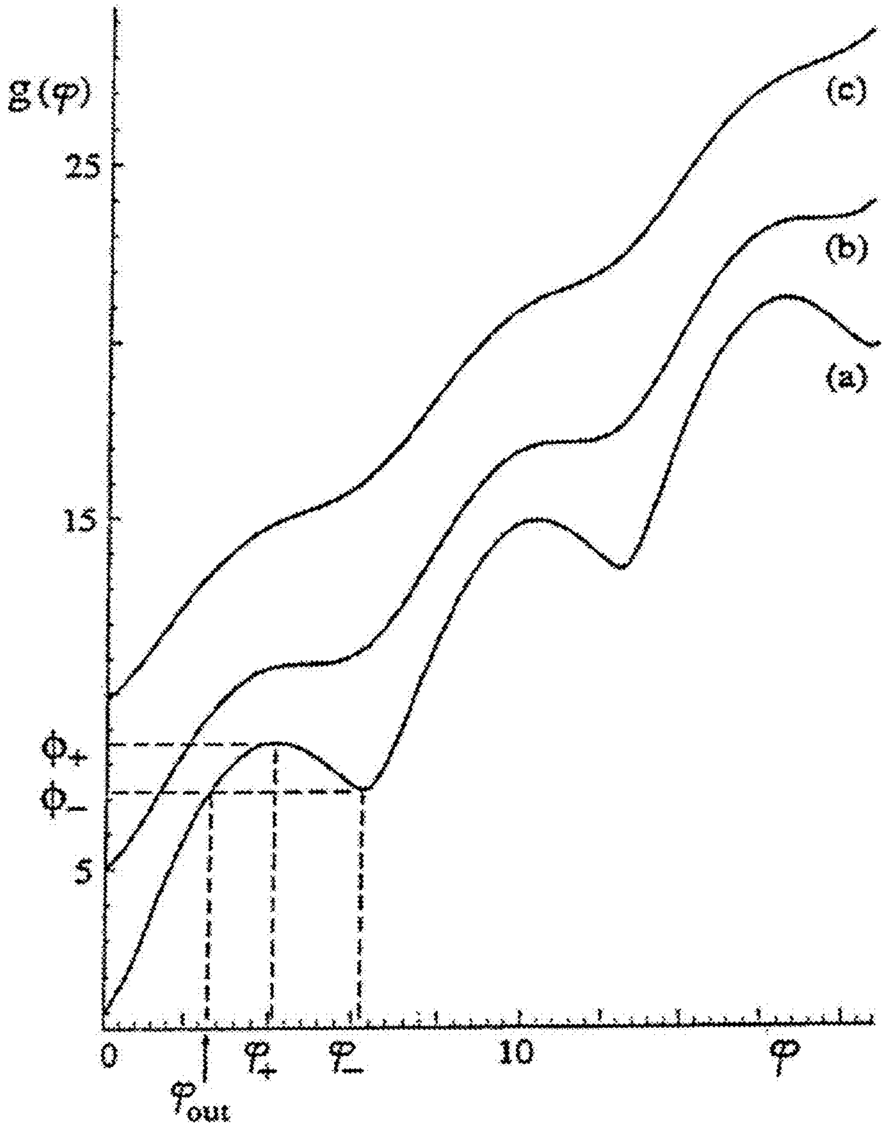
FIG. 2 is a graph showing the value of a function representing the emission time versus the retarded position for differing source points a, b, c within the polarizable medium in question.

These wave fronts possess an envelope because when r>c/ω, and so the speed of the source distribution pattern exceeds the wave speed, several wave fronts with differing emission times can pass through a single observation point simultaneously. Or stated mathematically, for certain values of the coordinates ($r_p$, $\hat{\varphi}_p$, $z_p$; r, z) the function g(φ) shown in FIG. 2 is oscillatory and so can equal ø at more than one value of the retarded position φ: a horizontal line φ=constant intersects the curve (a) in FIG. 2 at either one or three points. [FIG. 2 is drawn for $\varphi_p 0$, $\hat{r}_p=3$, $\hat{r}=2$ and (a) $\hat{z}=\hat{z}_p$, inside the envelope, (b) $\hat{z}=\hat{z}_c$, on the cusp curve of the envelope, (c) $\hat{z}=2\hat{z}_c-\hat{z}_p$, outside the envelope. The marked adjacent turning points of curve (a) have the coordinates (($\varphi_\pm$, $\varphi_\pm$), and $\varphi_{out}$ represents the solution of g(φ)=$\varphi_0$ for a $\varphi_0$ that tends to $\varphi_-$ from below.]

Wave fronts become tangent to one another and so form an envelope at those points ($r_p$, $\hat{\varphi}_p$, $z_p$) for which two roots of g(φ)=φ coincide. The equation describing this envelope can therefore be obtained by eliminating φ between g=φ and $\partial_g/\partial\varphi=0$ Thus, the values of φ on the envelope of the wave fronts are given by $$\partial g/\partial\varphi=1-\hat{r}\hat{r}_P\sin(\varphi_P-\varphi)/\hat{R}(\varphi)=0. \tag{7}$$

When the curve representing g(φ) is as in (a) of FIG. 2 (i.e. $\hat{r}>1$ and Δ>0), equation this has the doubly infinite set of solutions φ=φ±+2nπ, where $$\varphi_\pm = \varphi_P + 2\pi - \arccos\left[\left(1 \mp \Delta^{\frac{1}{2}}\right)/(\hat{r}\hat{r}_P)\right], \tag{8}$$

$$\Delta \equiv \left(\hat{r}_P^2-1\right)\left(\hat{r}^2-1\right)-(\hat{z}-\hat{z}_P)^2, \tag{9}$$

n is an integer, and ($\hat{r}$, $\hat{z}$,$\hat{r}_p$,$\hat{z}_p$) stand for the dimensionless coordinates rω/c, zω/c, $r_p$cω/c and $z_p$ω/c, respectively. The function g(φ) is locally maximum at $\varphi_+$2nπ and minimum at φ. +2nπ.

Inserting φ=φ±(5) and solving the resulting equation for ø as a function of ($\hat{r}_p$, $\hat{z}_p$), we find that the envelope of the wave fronts is composed of two sheets:

$$\phi = \phi_\pm \equiv g(\varphi_\pm) = 2\pi - \arccos\left[\left(1 \mp \Delta^{\frac{1}{2}}\right)/(\hat{r}\hat{r}_P)\right] + \hat{R}_\pm, \tag{10}$$

in which $$\hat{R}_\pm \equiv \left[(\hat{z}-\hat{z}_P)^2+\hat{r}^2+\hat{r}_P^2-2\left(1 \mp \Delta^{\frac{1}{2}}\right)\right]^{\frac{1}{2}} \tag{11}$$

are the values of $\hat{R}$ at φ=$\varphi_\pm$. For a fixed source point (r, $\hat{\varphi}$, z), equation (10) describes a tube-like spiralling surface in the ($r_p$, $\hat{\varphi}_p$, $z_p$)-space of observation points that extends from the speed-of-light cylinder $\hat{r}_p=1$ to infinity. [A three-dimensional view of the light cylinder and the envelope of the wave fronts for the same source point (S) as that in FIG. 1 is presented in FIG. 3A (only those parts of these surfaces are shown which lie within the cylindrical volume $\hat{r}_p\leq 9$, $-2.25\leq\hat{z}_p-\hat{z}\leq 2.25$).]

Figure 3A:
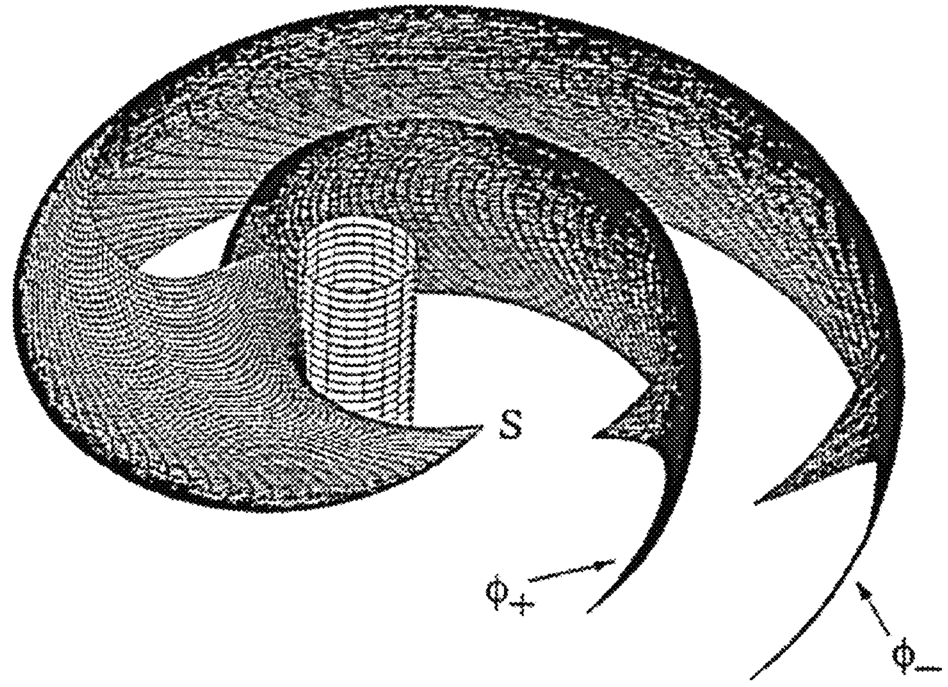
FIG. 3A is a perspective view of the envelope of the wave fronts shown in FIG. 1 showing the radiation pattern of a single volume element of the source.
Figure 4:
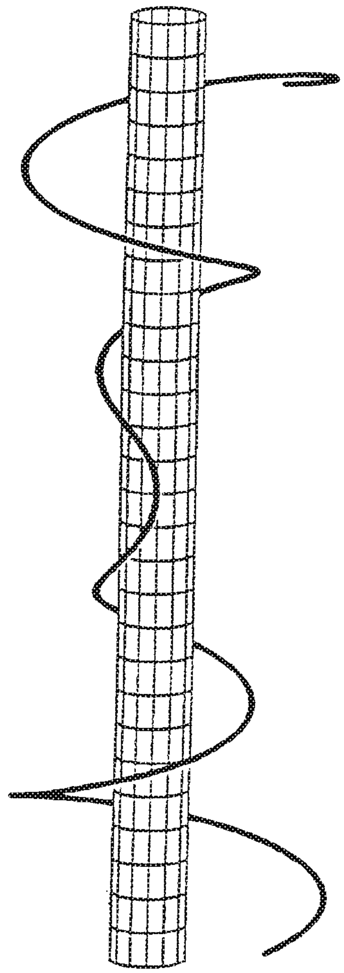
FIG. 4 is a view of the cusp curve of the envelope shown in FIG. 3A.

The two sheets φ=$\varphi_\pm$ of this envelope meet at a cusp. The cusp occurs along the curve $$\phi = 2\pi - \arccos[1/(\hat{r}\hat{r}_P)] + \left(\hat{r}_P^2\hat{r}^2-1\right)^{\frac{1}{2}} \equiv \phi_c, \tag{12a}$$

$$\hat{z} = \hat{z}_P \pm \left(\hat{r}_P^2-1\right)^{\frac{1}{2}}\left(\hat{r}^2-1\right)^{\frac{1}{2}} \equiv \hat{z}_c, \tag{12b}$$

shown in FIG. 4 and constitutues the locus of points at which three different wave fronts intersect tangentially. [FIG. 4 depicts the segment $-15\leq\hat{z}_P-\hat{z}\leq 15$ of the cusp curve of the envelope shown in FIG. 3A. This curve touches—and is tangent to—the light cylinder at the point ($\hat{r}_P=1$, $\hat{z}_P=\hat{z}$, $\varphi=\varphi_c|_{\hat{r}_P=1}$) on the plane of the orbit.]

On the cusp curve φ=$\varphi_c$, z=$z_c$, the function g(φ) has a point of inflection [(b) of FIGS. 2] and $\partial^2{}_g/\partial\varphi^2$, as well as $\partial_g/\partial\varphi$, and g vanish at $$\varphi=\varphi_P+2\pi-\arccos\,[1/(\hat{r}\hat{r}_P)]\equiv\varphi_c, \tag{12c}$$

This, in conjunction with t=(φ−$\hat{\varphi}$)/ω, represents the common emission time of the three wave fronts that are mutually tangential at the cusp curve of the envelope.

In the highly superluminal regime, where $\hat{r}>>1$, the separation of the ordinates $\varphi_+$ and $\varphi_-$ of adjacent maxima and minima in (a) of FIG. 2 can be greater than 2π. A horizontal line φ=constant will then intersect the curve representing g(φ) at more than three points, and so give rise to simultaneously received contributions that are made at 5, 7, . . . , distinct values of the retarded time. In such cases, the sheet $\varphi_-$ of the envelope (issuing from the conical apex of this surface) undergoes a number of intersections with the sheet $\varphi_+$ before reaching the cusp curve. We shall be concerned in this paper, however, mainly with source elements whose distances from the rotation axis do not appreciably exceed the radius c/w of the speed-of-light cylinder and so for which the equation g(φ)=φ has at most three solutions.

At points of tangency of their fronts, the waves which interfere constructively to form the envelope propagate normal to the sheets φ=$\varphi_\pm$ ($r_p$, $z_p$) of this surface, in the directions $$\hat{n}_\pm \equiv (c/\omega)\nabla_P(\phi_\pm-\phi) \tag{13}$$

$$= \hat{e}_{rp}\left[\hat{r}_P-\hat{r}_P^{-1}\left(1\mp\Delta^{\frac{1}{2}}\right)\right]/\hat{R}_\pm + \hat{e}_{\varphi p}/\hat{r}_P + \hat{e}_{zp}(\hat{z}_P-\hat{z})/\hat{R}_\pm,$$

with the speed c. ($\hat{e}_{r\,p}$, $\hat{e}\varphi_p$ and $\hat{e}_{z\,p}$ are the unit vectors associated with the cylindrical coordinates $r_p$, $\varphi_p$ and $z_p$ of the observation point, respectively.) Nevertheless, the resulting envelope is a rigidly rotating surface whose shape does not change with time: in the ($r_p$, $\hat{\varphi}_p$ and $z_p$)-space, its conical apex is stationary at (r, $\hat{\varphi}$, z), and its form and dimensions only depend on the constant parameter $\hat{r}$.

The set of waves that superpose coherently to form a particular section of the envelope or its cusp, therefore, cannot be the same (i.e. cannot have the same emission times) at different observation times. The packet of focused waves constituting any given segment of the cusp curve of the envelope, for instance, is constantly dispersed and reconstructed out of other waves. This one-dimensional caustic would not be unlimited in its extent, as shown in FIG. 4, unless the source distribution pattern is infinitely long-lived: only then would the duration of the source distribution pattern encompass the required intervals of emission time for every one of its constituent segments.

II. Amplitudes of the Waves Generated by a Point Source

Our discussion has been restricted so far to the geometrical features of the emitted wave fronts. In this section we proceed to find the Lienard-Wechert potential for these waves.

The scalar potential arising from a volume element of the moving distribution pattern of the source we have been considering is given by the retarded solution of the wave equation $$\nabla'^2 G_0 - \partial^2 G_0/\partial(ct')^2 = -4\pi\rho_0, \tag{14a}$$

in which $$\rho_0(r', \varphi', z', t') = \delta(r'-r)\delta(\varphi'-\omega t'-\hat{\varphi})\delta(z'-z)/r' \tag{14b}$$

is the density of a point source of unit strength with the trajectory (1). In the absence of boundaries, therefore, this potential has the value $$G_0(x_P, t_P) = \int d^3x'\,dt'\,\rho_0(x', t')\delta(t_P - t' - |x_P - x'|/c)/|x_P - x'| \tag{15a}$$

$$= \int_{-\infty}^{+\infty} dt'\,\delta[t_P - t' R(t')/c]/R(t'), \tag{15b}$$

where R(t') is the function defined in (4) (see e.g. Jackson, *Classical Electrodynamics,* Wiley, New York 1975).

If we use (1) to change the integration variable t' in (15b) to φ, and express the resulting integrand in terms of the quantities introduced in (3), (5) and (6), we arrive at $$G_0(r; r_P, \hat{\varphi}-\hat{\varphi}_P, z-z_P) = \int_{-\infty}^{+\infty} d\varphi\,\delta[g(\varphi)-\varphi]/R(\varphi). \tag{16}$$

This can then be rewritten, by formally evaluating the integral, as $$G_0 = \sum_{\varphi=\varphi_i} \frac{1}{R|\partial g/\partial\varphi|}, \tag{17}$$

where the angles $\varphi_j$ are the solutions of the transcendental equation g(φ)=φ in −∞<φ<+∞ and correspond, in conjunction with (1), to the retarded times at which the source point (r, $\hat{\varphi}$, z) makes its contribution towards the value of $G_0$ at the observation point ($r_p$, $\hat{\varphi}_p$, $z_p$).

Equation (17) shows, in the light of FIG. 2, that the potential $G_0$ of a point source is discontinuous on the envelope of the wave fronts: if we approach the envelope from outside, the sum in (17) has only a single term and yields a finite value for $G_0$, but if we approach this surface from inside, two of the $\varphi_j$ s coalesce at an extremum of g and (17) yields a divergent value for $G_0$. Approaching the sheet $\varphi=\varphi_+$ or $\varphi=\varphi_-$ of the envelope from inside this surface corresponds, in FIG. 2, to raising or lowering a horizontal line $\varphi=\varphi_0$=const., with $\varphi_-\leq\varphi_0\leq\varphi_+$ until it intersects the curve (a) of this figure at its maximum or minimum tangentially. At an observation point thus approached, the sum in (17) has three terms, two of which tend to infinity.

On the other hand, approaching a neighbouring observation point just outside the sheet $\varphi=\varphi_-$ (say) of the envelope corresponds, in FIG. 2, to raising a horizontal line $\varphi=\varphi_0$=const., with $\varphi_0\leq\varphi_-$ towards a limiting position in which it tends to touch curve (a) at its minimum. So long as it has not yet reached the limit, such a line intersects curve (a) at one point only. The equation g(φ)=φ therefore has only a single solution $\varphi=\varphi_{out}$ in this case which is different from both $\varphi_+$ and $\varphi_-$ and so at which ∂g/∂φ is non-zero (see FIG. 2). The contribution that the source distribution pattern makes when located at $\varphi=\varphi_{out}$ is received by both observers, but the constructively interfering waves that are emitted at the two retarded positions approaching φ. only reach the observer inside the envelope.

The function $G_0$ has an even stronger singularity at the cusp curve of the envelope. On this curve, all three of the $\varphi_j$s coalesce [(b) of FIG. 2] and each denominator in the expression in (17) both vanishes and has a vanishing derivative ($\partial_g/\partial\varphi=\partial^2_g/\partial\varphi^2=0$).

There is a standard asymptotic technique for evaluating radiation integrals with coalescing critical points that describe caustics. By applying this technique—which we have outlined in Appendix A—to the integral in (16), we can obtain a uniform asymptotic approximation to $G_0$ for small $|\varphi_+-\varphi_-|$, i.e. for points close to the cusp curve of the envelope where $G_0$ is most singular. The result is $$G_0^{in} \sim 2c_1^{-2}(1-\chi^2)^{-\frac{1}{2}}\left[p_0\cos\left(\frac{1}{3}\arcsin\chi\right) - c_1 q_0 \sin\left(\frac{2}{3}\arcsin\chi\right)\right], \quad |\chi| < 1, \tag{18}$$

and $$G_0^{out} \sim c_1^{-2}(\chi^2-1)^{-\frac{1}{2}} \left[p_0\sinh\left(\frac{1}{3}\operatorname{arccosh}|\chi|\right) + c_1 q_0 \operatorname{sgn}(\chi)\sinh\left(\frac{2}{3}\operatorname{arccosh}|\chi|\right)\right], \quad |\chi| > 1, \tag{19}$$

where $c_1$, $p_0$, $q_0$ and X are the functions of (r, z) defined in (A2), (A5), (A6) and (A10), and approximated in (A23)-(A30). The superscripts 'in' and 'out' designate the values of $G_0$ inside and outside the envelope, and the variable X equals +1 and −1 on the sheets $\varphi=\varphi_+$ and $\varphi=\varphi_-$ of this surface, respectively.

The function $G_0^{out}$ is indeterminate but finite on the envelope [cf. (A39)], whereas $G_0^{in}$ diverges like $$\sqrt{3}\,c_1^{-2}(p_0 \mp c_1 q_0)\Big/(1-\chi^2)^{\frac{1}{2}} \text{ as } \chi \to \pm 1.$$

The singularity structure of $G_0^{in}$ close to the cusp curve is explicitly exhibited by $$G_0^{in} \sim \frac{2}{3^{\frac{1}{6}}}(\omega/c)\left(\hat{r}^2\hat{r}_P^2 - 1\right)^{-\frac{1}{2}} c_0^{\frac{1}{2}} (\hat{z}_c - \hat{z})^{\frac{1}{2}} \Big/ \left[c_0^3(\hat{z}_c - \hat{z})^3 - (\phi_c - \phi)^2\right]^{\frac{1}{2}}, \tag{20}$$

in which $0\leq\hat{z}_e-\hat{z}\ll 1$, $|\varphi_e-\varphi|\ll 1$ and $$c_0 \equiv \frac{2}{3^{\frac{2}{3}}}\left(\hat{r}^2\hat{r}_P^2 - 1\right)^{-1}\left(\hat{r}_P^2 - 1\right)^{\frac{1}{2}}\left(\hat{r}^2 - 1\right)^{\frac{1}{2}} \tag{21}$$

[see (18) and (A22)-(A26)]. It can be seen from this expression that both the singularity on the envelope (at which the quantity inside the square brackets vanishes) and the singularity at the cusp curve (at which $\hat{z}_c-\hat{z}$ and $\varphi_c-\varphi$ vanish) are integrable singularities.

The potential of a volume source, which is given by the superposition of the potentials $G_0$ of its constituent volume elements, and so involves integrations with respect to $(r, \hat{\varphi}, z)$, is therefore finite. Since they are created by the coordinated motion of aggregates of particles, the types of source distribution patterns we have been considering cannot, of course, be point-like. It is only in the physically unrealizable case where the distribution pattern of a superluminal source is point-like that its potential has the extended singularities described above.

In fact, not only is the potential of an extended source with a superluminally moving distribution pattern singularity free, but it decays in the far zone like the potential of any other source. The following alternative form of the retarded solution to the wave equation $\nabla^2 A_0 - \partial^2 A_0/\partial(ct)^2 = -4\pi\rho$ [which may be obtained from (15a) by performing the integration with respect to time]:

$$A_0 = \int d^3x \rho(x,\ t_P - |x - x_P|/c)/|x - x_P| \tag{22}$$

shows that if the density $\rho$ of the source is finite and vanishes outside a finite volume, then the potential $A_0$ decays like $|x_p|^{-1}$ as the distance $|x_p - x| \cong |x_p|$ of the observer from the source tends to infinity.

III. The Bifurcation Surface of an Observer

Let us now consider an extended source distribution pattern which rotates about the z-axis with the constant angular frequency $\omega$. The density of such a source—when it has a distribution with an unchanging pattern—is given by $$\rho(r, \varphi, z, t) = \rho(r, \hat{\varphi}, z), \tag{23}$$

where the Lagrangian variable $\hat{\varphi}$ is defined by $\varphi - \omega t$ as in (1), and $\rho$ can be any function of $(r, \hat{\varphi}, z)$ that vanishes outside a finite volume.

If we insert this density in the expression for the retarded scalar potential and change the variables of integration from $(r, \hat{\varphi}, z, t)$ to $(r, \hat{\varphi}, z, t)$, we obtain $$A_0(x_P, t_P) = \int d^3x dt \rho(x, t) \delta(t_P - t - |x - x_P|/c)/|x - x_P| \tag{24a}$$

$$= \int r dr d\hat{\varphi} dz \rho(r, \hat{\varphi}, z) G_0(r, r_P, \hat{\varphi} - \hat{\varphi}_P, z - z_P), \tag{24b}$$

where $G_0$ is the function defined in (16) which represents the scalar potential of a corresponding point source. That the potential of the extended source distribution pattern in question is given by the superposition of the potentials of the moving source points that constitute the distribution pattern is an advantage that is gained by marking the space of source points with the natural coordinates $(r, \hat{\varphi}, z)$ of the source distribution pattern. This advantage is lost if we use any other coordinates.

In Sec. II, where the distribution pattern of the source was point-like, the coordinates $(r, \hat{\varphi}, z)$ of the source point in $G_0(r, r_p, \hat{\varphi} - \hat{\varphi}_p, z - z_p)$ were held fixed and we were concerned with the behaviour of this potential as a function of the coordinates $(r_p, \hat{\varphi}_p, z_p)$ of the observation point. When we superpose the potentials of the volume elements that constitute an extended source distribution pattern, on the other hand, the coordinates $(r_p, \hat{\varphi}_p, z_p)$ are held fixed and we are primarily concerned with the behaviour of $G_0$ as a function of the integration variables $(r, \hat{\varphi}, z)$.

Figure 5:
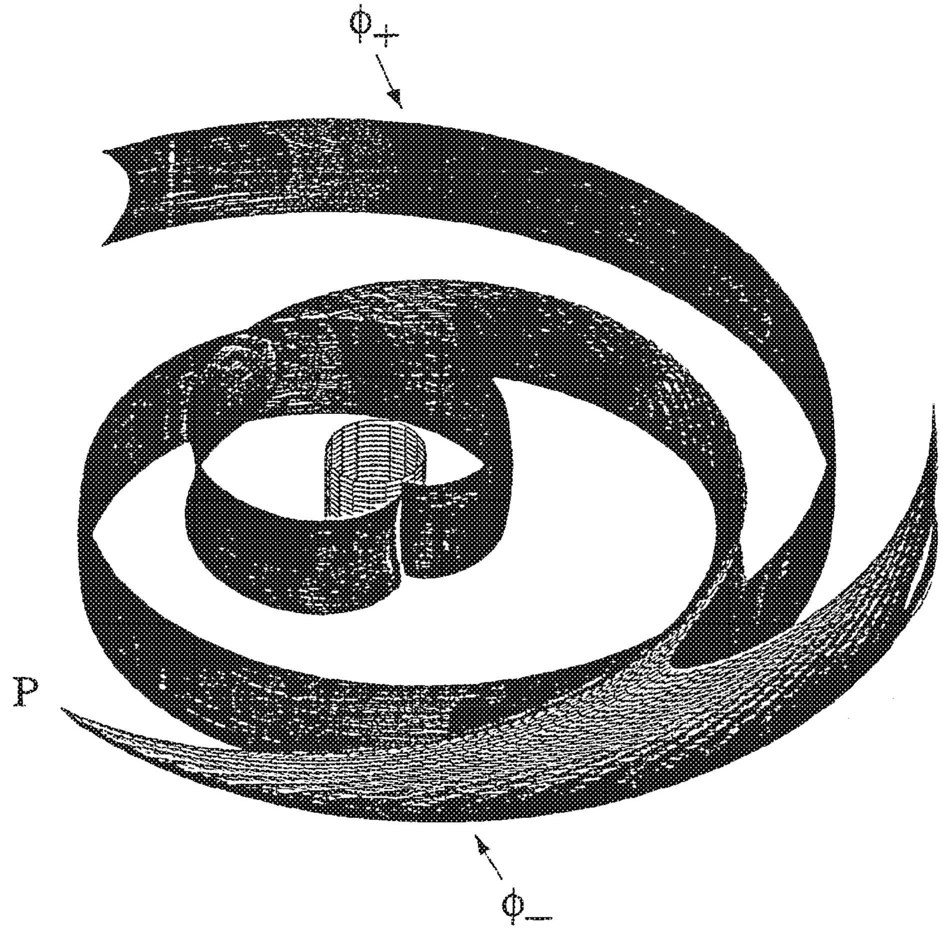
FIG. 5 is the locus of the possible source points which approach the observation point P along the radiation direction with the wave speed at the retarded time, a locus that is henceforth referred to as the bifurcation surface of the observer at P.

Because $G_0$ is invariant under the interchange of $(r, \hat{\varphi}, z)$ and $(r_P, \hat{\varphi}_P, z_P)$ if $\varphi$ is at the same time changed to $-\varphi$[see (5) and (16)], the singularity of $G_0$ occurs on a surface in the $(r, \hat{\varphi}, z)$-space of source points which has the same shape as the envelope shown in FIG. 3A but issues from the fixed point $(r_P, \hat{\varphi}_P, z_P)$ and spirals around the z-axis in the opposite direction to the envelope. [FIG. 5 in which the light cylinder and the bifurcation surface associated with the observation point P are shown for a counterclockwise motion of the source distribution pattern. In this figure P is located at $\hat{r}_P=9$, and only those parts of these surfaces are shown which lie within the cylindrical volume $\hat{r} \le 11$, $-1.5 \le \hat{z} - \hat{z}_P \le 1.5$. The two sheets $\varphi = \varphi_\pm(r,z)$ of the bifurcation surface meet along a cusp (a curve of the same shape as that shown in FIG. 4) that is tangent to the light cylinder. For an observation point in the far zone ($\hat{r}_P >> 1$), the spiralling surface that issues from P undergoes a large number of turns—in which its two sheets intersect one another—before reaching the light cylinder.]

In this paper, we refer to this locus of singularities of $G_0$ as the bifurcation surface of the observation point P.

Figure 6:
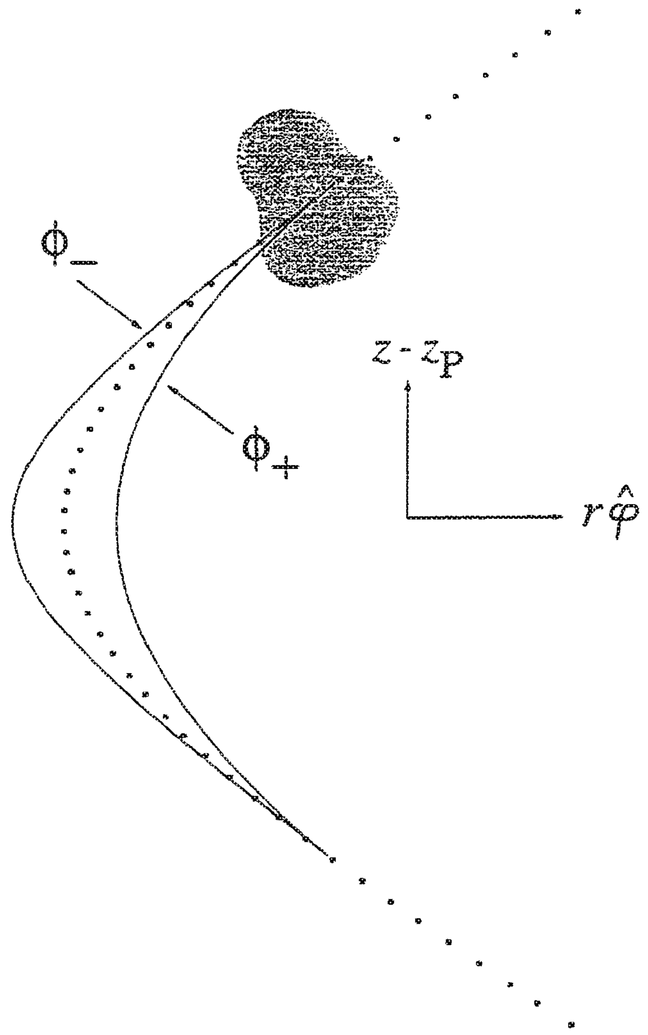
FIG. 6 is a view of the cross sections of the bifurcation surface and the source distribution pattern with a cylinder whose axis coincides with the rotation axis of the source.

Consider an observation point P for which the bifurcation surface intersects the source distribution pattern, as in FIG. 6. [In FIG. 6, the full curves depict the cross section, with the cylinder $\hat{r}=1.5$, of the bifurcation surface of an observer located at $\hat{r}_p=3$. (The motion of the source distribution pattern is counterclockwise.) Projection of the cusp curve of this bifurcation surface onto the cylinder $\hat{r}=1.5$ is shown as a dotted curve, and the region occupied by the source distribution pattern as a dotted area. In this figure the observer's position is such that one of the points $(\varphi=\varphi_c, z=z_c)$ at which the cusp curve in question intersects the cylinder $\hat{r}=1.5$—the one with $z_c>0$—is located within the source distribution pattern. As the radial position $r_p$ of the observation point tends to infinity, the separation—at a finite distance $z_c - z$ from $((\varphi_c, z_c)$—of the shown cross sections decreases like $$r_P^{-\frac{3}{2}}.]$$

The envelope of the wave fronts emanating from a volume element of the part of the source distribution pattern that lies within this bifurcation surface encloses the point P, but P is exterior to the envelope associated with an element of the source distribution pattern that lies outside the bifurcation surface.

We have seen that three wave fronts—propagating in different directions—simultaneously pass an observer who is located inside the envelope of the waves emanating from a point source, and only one wavefront passes an observer outside this surface. Hence, in contrast to the elements of the source distribution pattern outside the bifurcation surface which influence the potential at P at only a single value of the retarded time, this potential receives contributions from each of the elements inside the bifurcation surface at three distinct values of the retarded time.

The elements of the source distribution pattern inside but adjacent to the bifurcation surface, for which $G_0$ diverges, are sources of the constructively interfering waves that not only arrive at P simultaneously but also are emitted at the same (retarded) time. These elements of the source distribution pattern approach the observer along the radiation direction $x_p - x$ with the wave speed at the retarded time, i.e. are located at distances R(t) from the observer for which $$\left.\frac{dR}{dt}\right|_{t=t_P-R/c} = -c \tag{25}$$

[see (4), (7) and (8)]. Their accelerations at the retarded time, $$\left.\frac{d^2R}{dt^2}\right|_{t=t_P-R/c} = \mp\frac{c\omega\Delta^{\frac{1}{2}}}{\hat{R}_\pm}, \tag{26}$$

are positive on the sheet $\varphi=\varphi_-$ of the bifurcation surface and negative on $\varphi=\varphi_+$.

The elements of the source distribution pattern on the cusp curve of the bifurcation surface, for which $\Delta=0$ and all three of the contributing retarded times coincide, approach the observer—according to (26)—with zero acceleration as well as with the wave speed.

From a radiative point of view, the most effective volume elements of the distribution pattern of the superluminal source in question are those that approach the observer along the radiation direction with the wave speed and zero acceleration at the retarded time, since the ratio of the emission to reception time intervals for the waves that are generated by these particular elements of the source distribution pattern generally exceeds unity by several orders of magnitude. On each constituent ring of the source distribution pattern that lies outside the light cylinder ($r=c/\omega$) in a plane of rotation containing the observation point, there are two volume elements that approach the observer with the wave speed at the retarded time: one whose distance from the observer diminishes with positive acceleration, and another for which this acceleration is negative. These two elements are closer to one another the smaller the radius of the ring. For the smallest of such constituent rings, i.e. for the one that lies on the light cylinder, the two volume elements in question coincide and approach the observer also with zero acceleration.

The other constituent rings of the source distribution pattern (those on the planes of rotation which do not pass through the observation point) likewise contain two such elements if their radii are large enough for their velocity $r\omega e_\varphi$ to have a component along the radiation direction equal to c. On the smallest possible ring in each plane, there is again a single volume element—at the limiting position of the two coalescing volume elements of the neighbouring larger rings—that moves towards the observer not only with the wave speed but also with zero acceleration.

For any given observation point P, the efficiently radiating pairs of volume elements on various constituent rings of the source distribution pattern collectively form a surface: the part of the bifurcation surface associated with P which intersects the source distribution pattern. The locus of the coincident pairs of volume elements, which is tangent to the light cylinder at the point where it crosses the plane of rotation containing the observer, constitutes the segment of the cusp curve of this bifurcation surface that lies within the source distribution pattern.

Thus the bifurcation surface associated with any given observation point divides the volume of the source distribution pattern into two sets of elements with differing influences on the observed field. As in (18) and (19), the potentials $G_0^{in}$ and $G_0^{out}$ of the source distribution pattern's elements inside and outside the bifurcation surface have different forms: the boundary $|\chi(r, r_P, \hat{\varphi}-\hat{\varphi}_P, z-z_P)|=1$ between the domains of validity of (18) and (19) delineates the envelope of wave fronts when the source point $(r, \hat{\varphi}, z)$ is fixed and the coordinates $(r_p, \hat{\varphi}_p, z_p)$ of the observation point are variable, and describes the bifurcation surface when the observation point $(r_p, \hat{\varphi}_p, z_p)$ is fixed and the coordinates $(r, \hat{\varphi}, z)$ of the source point sweep a volume.

The expression (24b) for the scalar potential correspondingly splits into the following two terms when the observation point is such that the bifurcation surface intersects the source distribution pattern:

$$A_0 = \int dV_\rho G_0 \tag{27a}$$

$$= \int_{V_{in}} dV_\rho G_0^{in} + \int_{V_{out}} dV_\rho G_0^{out}, \tag{27b}$$

where $dV \equiv r\,dr\,d\hat{\varphi}\,dz$, $V_{in}$ and $V_{out}$ designate the portions of the source distribution pattern which fall inside and outside the bifurcation surface (see FIG. 6), and $G_0^{in}$ and $G_0^{out}$ denote the different expressions for $G_0$ in these two regions.

Note that the boundaries of the volume $V_{in}$ depend on the position $(r_p, \hat{\varphi}_p, z_p)$ of the observer: the parameter $\hat{r}_p$ fixes the shape and size of the bifurcation surface, and the position $(r_p, \hat{\varphi}_p, z_p)$ of the observer specifies the location of the conical apex of this surface. When the observation point is such that the cusp curve of the bifurcation surface intersects the source distribution pattern, the volume $V_{in}$ is bounded by $\varphi=\varphi_-$, $\varphi=\varphi_+$ and the part of the boundary $\rho(r, \hat{\varphi}, z)=0$ of the distribution pattern that falls within the bifurcation surface. The corresponding volume $V_{out}$ is bounded by the same patches of the two sheets of the bifurcation surface and by the remainder of the boundary of the source distribution pattern.

In the vicinity of the cusp curve (12), i.e. for $|\varphi_c-\varphi|<<1$ and $0\le\hat{z}_c-\hat{z}<<1$, the cross section of the bifurcation surface with a cylinder $\hat{r}$=constant is described by $$\phi_\pm - \phi_c \simeq -(\hat{r}^2-1)^{\frac{1}{2}}(\hat{r}_P^2-1)^{\frac{1}{2}}(\hat{r}^2\hat{r}_P^2-1)^{-\frac{1}{2}}(\hat{z}_c-\hat{z}) \pm \frac{2^{\frac{3}{2}}}{3}(\hat{r}^2-1)^{\frac{3}{4}}(\hat{r}_P^2-1)^{\frac{3}{4}}(\hat{r}_P^2\hat{r}^2-1)^{-\frac{3}{2}}(\hat{z}_c-\hat{z})^{\frac{3}{2}} \tag{28}$$

[see (10)-(12) and (A26)]. This cross section, which is shown in FIG. 6, has two branches meeting at the intersections of the cusp curve with the cylinder $\hat{r}$=constant whose separation $\varphi$—at a given $(\hat{z}_c-\hat{z})$—diminishes like $$\hat{r}_P^{-\frac{3}{2}}$$

in the limit $\hat{r}_p\to\infty$. Thus, at finite distances $\hat{z}_c-\hat{z}$ from the cusp curve, the two sheets $\varphi=\varphi_-$ and $\varphi=\varphi_+$ of the bifurcation surface coalesce and become coincident with the surface $$\phi = \frac{1}{2}(\phi_- + \phi_+) \equiv c_2 \text{ as } \hat{r}_P \to \infty.$$

That is to say, the volume $V_{in}$ vanishes like $$\hat{r}_P^{-\frac{3}{2}}.$$

Because the dominant contributions towards the value of the radiation field come from those source distribution pattern's elements that approach the observer—along the radiation direction—with the wave speed and zero acceleration at the retarded time, in what follows, we shall be primarily interested in far-field observers the cusp curves of whose bifurcation surfaces intersect the source distribution pattern. For such observers, the Green's function $$\lim_{\hat{r}_P \to \infty} G_0$$

undergoes a jump discontinuity across the coalescing sheets of the bifurcation surface: the values of X on the sheets $\varphi=\varphi_\pm$ and hence the functions $G_0^{out}|\varphi=\varphi_-$ and $G_0^{out}|\varphi=\varphi_+$ remain different even in the limit where $\varphi=\varphi_-$ and $\varphi=\varphi_-$ coincide [cf. (A10) and (A39)].

IV. Derivatives of the Radiation Integrals and Their Hadamard's Finite Parts

A. Gradient of the Scalar Potential

In this section we begin the calculation of the electric and magnetic fields by finding the gradient of the scalar potential $A_0$, i.e. by calculating the derivatives of the integral in (27a) with respect to the coordinates $(r_p, \hat{\varphi}_p, z_p)$ of the observation point.

If we regard its singular kernel $G_0$ as a classical function, then the integral in (27a) is improper and cannot be differentiated under the integral sign without characterizing and duly handling the singularities of its integrand. On the other hand, if we regard $G_0$ as a generalized function, then it would be mathematically permissible to interchange the orders of differentiation and integration when calculating .gradient $\nabla_P A_0$.

This interchange results in a new kernel .gradient $\nabla_P G_0$ whose singularities are non-integrable. However, the theory of generalized functions prescribes a well-defined procedure for obtaining the physically relevant value of the resulting divergent integral, a procedure involving integration by parts which extracts the so-called Hadamard's finite part of this integral (see e.g. Hoskins, Generalised Functions, Ellis Horwood, London 1979).

Hadamard's finite part of the divergent integral representing $\nabla_P A_0$.yields the value that we would have obtained if we had first evaluated the original integral for $A_0$ as an explicit function of $(r_p, \hat{\varphi}_p, z_p)$ and then differentiated it. From the standpoint of the theory of generalized functions, therefore, differentiation of (27a) yields $$\nabla_P A_0 = \int dV_\rho \nabla_P G_0 = (\nabla_P A_0)_{in} + (\nabla_P A_0)_{out}, \tag{29a}$$

in which $$(\nabla_P A_0)_{in,out} \equiv \int_{V_{in,out}} dv_\rho \nabla_P G_0^{in,out}, \tag{29b}$$

Since ρ vanishes outside a finite volume, the integral in (27a) extends over all values of $(r, \hat{\varphi}, z)$ and so there is no contribution from the limits of integration towards the derivative of this integral.

The kernels $\nabla_P G_0^{in,out}$ of the above integrals may be obtained from (16). Applying $\nabla_P$ to the right-hand side of (16) and interchanging the orders of differentiation and integration, we obtain an integral representation of $\nabla_P G_0$ consisting of two terms: one arising from the differentiation of R which decays like $r_p^{-2}$ as $r_p \to \infty$ and so makes no contribution to the field in the radiation zone, and another that arises from the differentiation of the Dirac delta function and decays less rapidly than $r_p^{-2}$. For an observation point in the radiation zone, we may discard terms of the order of $r_p^{-2}$ and write $$\nabla_P G_0 \cong (\omega/c) \int_{-\infty}^{+\infty} d\varphi R^{-1} \delta'(g-\varphi) \hat{n}, \quad \hat{r}_P >> 1, \tag{30}$$

in which δ' is the derivative of the Dirac delta function with respect to its argument and $$\hat{n} \equiv \hat{e}_{rP}[\hat{r}_P - \hat{r}\cos(\varphi-\varphi_P)]/\hat{R} + \hat{e}_{\varphi P}/\hat{r}_P + \hat{e}_{zP}(\hat{z}_P - \hat{z})/\hat{R}. \tag{31}$$

Equation (30) yields $\nabla_P G_0^{in}$ or .gradient $\nabla_P G_0^{out}$ depending on whether φ lies within the interval $(\varphi_-, \varphi_+)$ or outside it.

If we now insert (30) in (29b) and perform the integrations with respect to $\hat{\varphi}$ by parts, we find that $$(\nabla_p A_0)_{in} \simeq (\omega/c) \int_S r dr dz \left\{ -[\rho G_1^{in}]_{\phi=\phi_-}^{\phi=\phi_+} + \int_{\phi_-}^{\phi_+} d\phi \partial\rho/\partial\hat{\varphi} G_1^{in} \right\}, \quad \hat{r}_P \gg 1, \tag{32}$$

and $$(\nabla_p A_0)_{out} \simeq (\omega/c) \int_S r dr dz \left\{ [\rho G_1^{out}]_{\phi=\phi_-}^{\phi=\phi_+} + \left( \int_{-\pi}^{\phi_-} + \int_{\phi_+}^{+\pi} \right) d\phi \partial\rho/\partial\hat{\varphi} G_1^{out} \right\}, \quad \hat{r}_P \gg 1, \tag{33}$$

in which S stands for the projection of $V_{in}$ onto the (r, z)-plane, and $G_1^{in}$ and $G_1^{out}$ are given by the values of $$G_1 = \int_{-\infty}^{+\infty} d\varphi R^{-1} \delta(g-\phi) \hat{n} = \sum_{\varphi=\varphi_i} R^{-1} |\partial g/\partial\varphi|^{-1} \hat{n} \tag{34}$$

for φ inside and outside the interval $(\varphi_-, \varphi_+)$, respectively.

Like $G_0^{in}$, the Green's function $G_1^{in}$ diverges on the bifurcation surface $\varphi=\varphi_\pm$ where $\partial g/\partial\varphi$ vanishes, but this singularity of $G_0^{in}$ is integrable so that the value of the second integral in (32) is finite (see Sec. II and Appendix A). Hadamard's finite part of $(\nabla_P A_0)_{in}$ (denoted by the prefix Fp) is obtained by simply discarding those 'integrated' or boundary terms in (32) which diverge. Hence, the physically relevant quantity $Fp\{(\nabla_P A_0)_{in}\}$ consists—in the far zone—of the volume integral in (32).

Let us choose an observation point for which the cusp curve of the bifurcation surface intersects the source distribution pattern (see FIG. 6). When the dimensions (~L) of the source are negligibly smaller than those of the bifurcation surface (i.e. when $L<<r_p$ and so $z_c-z<<r_p$ throughout the source distribution pattern) the functions $G_1^{in,out}$ in (32) and (33) can be approximated by their asymptotic values (A34) and (A35) in the vicinity of the cusp curve (see Appendix A).

According to (A34), (A36) and (A44), $G_1^{in}$ decays like $p_1/c_1^2=O(1)$ at points interior to the bifurcation surface where $$\lim_{R_P \to \infty} \chi$$

remains finite. since the separation of the two sheets of the bifurcation surface diminishes like $$\hat{r}_P^{-\frac{3}{2}}$$

within the source distribution pattern [see (28)], it therefore follows that the volume integral in (32) is of the order of $$1\times\hat{r}_P^{-\frac{3}{2}},$$

a result which can also be inferred from the far-field version of (A34) by explicit integration. Hence, $$Fp\{(\nabla_P A_0)_{in}\} = O(\hat{r}_P^{-\frac{3}{2}}),\ \hat{r}_P \gg 1, \tag{35}$$

decays too rapidly to make any contribution towards the value of the electric field in the radiation zone.

Because $G_1^{out}$ is, in contrast to $G_1^{in}$, finite on the bifurcation surface, both the surface and the volume integrals on the right-hand side of (33) have finite values. Each component of the second term has the same structure as the expression for the potential itself and so decays like $r_p^{-1}$ (see the ultimate paragraph of Sec. II). But the first term—which would have cancelled the corresponding boundary term in (32) and so would not have survived in the expression for $\nabla_P A_0$ had the Green's function $G_1$ been continuous—behaves differently from any conventional contribution to a radiation field.

Insertion of (A39) in (33) yields the following expression for the asymptotic value of this boundary term in the limit where the observer is located in the far zone and the source distribution pattern is localized about the cusp curve of his (her) bifurcation surface:

$$\int rdrdz[\rho G_1^{out}]_{\phi_-}^{\phi_+} \sim \frac{1}{3}c_1^{-2}\int rdrdz\left[p_1\left(\rho|_{\phi_+}-\rho|_{\phi_-}\right)+2c_1q_1\left(\rho|_{\phi_+}-\rho|_{\phi_-}\right)\right]. \tag{36}$$

In this limit, the two sheets of the bifurcation surface are essentially coincident throughout the domain of integration in (36) [see (28)]. So the difference between the values of the source density on these two sheets of the bifurcation surface is negligibly small $$\left(\sim\hat{r}_P^{-\frac{3}{2}}\right)$$

for a smoothly distributed source pattern and the functions $\rho|\varphi_{35}$ appearing in the integrand of (36) may correspondingly be approximated by their common limiting value ρbs(r, z) on these coalescing sheets.

Once the functions $\rho|\varphi_\pm$ are approximated by ρbs(r, z) and $q_1$ by (A41), equation (36) yields an expression which can be written, to within the leading order in the far-field approximation $\hat{r}_p$<<1 [see (A44) and (A45)], as $$\int_S rdrdz[\rho G_1^{out}]_{\phi_-}^{\phi_+} \sim 2^{\frac{3}{2}}(c/\omega)^2\hat{r}_P^{-\frac{3}{2}}\int_{\hat{r}_<}^{\hat{r}_>} d\hat{r}\left(\hat{r}^2-1\right)^{-\frac{1}{4}}n_1 \times \int_{\hat{z}_c-L_{\hat{z}}\omega/c}^{\hat{z}_c} d\hat{z}(\hat{z}_c-\hat{z})^{-\frac{1}{2}}\rho_{bs}(r,z) \sim 2^{\frac{5}{2}}(c/\omega)^2\hat{r}_P^{-\frac{3}{2}}\int_{\hat{r}_<}^{\hat{r}_>} d\hat{r}\left(\hat{r}^2-1\right)^{-\frac{1}{4}}n_1(L_{\hat{z}}\omega/c)^{\frac{1}{2}}\langle\rho_{bs}\rangle, \tag{37}$$

with $$\langle\rho_{bs}\rangle(r) \equiv \int_0^1 d\eta\rho_{bs}(r,z)\Big|_{z=z_c-\eta^2L_{\hat{z}}}, \tag{38}$$

where $z_c-L_2(r)\le z\le z_c$ and r<≤r≤r< are the intervals over which the bifurcation surface intersects the source distribution pattern (see FIG. 6). The quantity (ρbs) (r) may be interpreted, at any given r, as a weighted average—over the intersection of the coalescing sheets of the bifurcation surface with the plane $z=z_c-\eta^2 L_{\hat{z}}$→ of the source density ρ.

The right-hand side of (37) decays like $$rp^{-\frac{3}{2}}\ as\ rp\to\infty.$$

The second term in (33) thus dominates the first term in this equation, and so the quantity $(\nabla_P A_0)_{out}$ itself decays like $r_p^{-1}$ in the far zone.

B. Time Derivative of the Vector Potential

Inasmuch as the charge density (23) has an unchanging distribution pattern in the (r, $\hat{\varphi}$, z)-frame, the electric current density associated with the moving source distribution pattern we have been considering is given by $$j(x,t)=r\omega\rho(r,\hat{\varphi},z)\hat{e}_\varphi, \tag{39}$$

in which $r\omega\hat{e}_\varphi=r\omega[-\sin(\varphi-\varphi_P)\hat{e}_{rP}+\cos(\varphi-\varphi_P)\hat{e}_{\varphi P}]$ is the velocity of the element of the source distribution pattern that is located at (r, $\hat{\varphi}$, z). This current satisfies the continuity equation ∂ρ/∂(ct)+∇·j=0 automatically.

In the Lorentz gauge, the retarded vector potential corresponding to (24a) has the form $$A(x_P,t_P)=c^{-1}\int d^3x dt j(x,t)\delta(t_P-t-|x-x_P|/c)/|x-x_P|. \tag{40}$$

If we insert (39) in (40) and change the variables of integration from (r, φ, z, t) to (r, φ, z, $\hat{\varphi}$), as in (24), we obtain $$A=\int dV\hat{r}\rho(r,\hat{\varphi},z)G_2(r,r_P,\hat{\varphi}-\hat{\varphi}_P,z-z_P), \tag{41}$$

in which dV=rdrd$\hat{\varphi}$ dz, the vector $G_2$—which plays the role of a Green's function—is given by $$G_2 \equiv \int_{-\infty}^{+\infty} d\varphi\hat{e}_\varphi\delta[g(\varphi)-\phi]/R(\varphi) = \sum_{\varphi=\varphi_j} R^{-1}|\partial g/\partial\varphi|^{-1}\hat{e}_\varphi, \tag{42}$$

and g and $\varphi_j$s are the same quantities as those appearing in (17) (see also FIG. 2).

Because (17), (34) and (42) have the factor $|\partial_g/\partial\varphi|^{-1}$ in common, the function $G_2$ has the same singularity structure as those of $G_0$ and $G_1$: it diverges on the bifurcation surface $\partial_g/\partial\varphi=0$ if this surface is approached from inside, and it is most singular on the cusp curve of the bifurcation surface where in addition $\partial^2 g/\partial\varphi^2=0$. It is, moreover, described by two different expressions, $G_2^{in}$ and $G_2^{out}$, inside and outside the bifurcation surface whose asymptotic values in the neighbourhood of the cusp curve have exactly the same functional forms as those found in (18) and (19); the only difference being that $p_0$ and $q_0$ in these expressions are replaced by the $p_2$ and $q_2$ given in (A37) (see Appendix A).

As in (29), therefore, the time derivative of the vector potential has the form $\partial A/\partial t_P = (\partial A/\partial t_P)_{in} + (\partial A/\partial t_P)_{out}$ with $$(\partial A/\partial t_P)_{in,out} \equiv -\omega \int_{V_{in,out}} dV \hat{r} \rho \partial G_2^{in,out}/\partial \hat{\varphi}_P \tag{43}$$

when the observation point is such that the bifurcation surface intersects the source distribution pattern.

The functions $G_2^{in,out}$ depend on $\hat{\varphi}_p$ and $\hat{\varphi}$ in the combination $\hat{\varphi}-\hat{\varphi}_p$ only. We can therefore replace $\partial/\partial\hat{\varphi}_p$ in (43) by—$\partial/\partial\hat{\varphi}$ and perform the integration with respect to $\hat{\varphi}$ by parts to arrive at $$(\partial A/\partial t_p)_{in} = c\int_S drdz\hat{r}^2\left\{[\rho G_2^{in}]_{\phi=\phi_-}^{\phi=\phi_+} - \int_{\phi_-}^{\phi_+} d\phi\partial\rho/\partial\hat{\varphi}G_2^{in}\right\}, \tag{44}$$

and $$(\partial A/\partial t_p)_{out} = -c\int_S drdz\hat{r}^2\left\{[\rho G_2^{out}]_{\phi=\phi_-}^{\phi=\phi_+} + \left(\int_{-\pi}^{\phi_-} + \int_{\phi_+}^{+\pi}\right)d\phi\partial\rho/\partial\hat{\varphi}G_2^{out}\right\}. \tag{45}$$

For the same reasons as those given in the paragraphs following (32) and (33), Hadamard's finite part of $(\partial A/\partial t_p)_{in}$ consists of the volume integral in (44) and is of the order of $$\hat{r}_p^{-\frac{3}{2}}$$

[note that according to (A37) and (A42), $p_2 \gg c_1 q_2$ and $p_2/c_1^2 = O(i)$]. The volume integral in (45), moreover, decays like $$\hat{r}_p^{-1},$$

as does its counterpart in (33).

The part of $\partial A/\partial t_p$ that decays more slowly than conventional contributions to a radiation field is the boundary term in (45). The asymptotic value of this term is given by an expression similar to that appearing in (36), except that $p_1$ and $q_1$ are replaced by $p_2$ and $q_2$. Once the quantities and $\rho|\varphi_\pm$ in the expression in question are approximated by $\rho_{bs}$ and by (A42), as before, it follows that $$(\partial A/\partial t_p)_{out} \sim -c\int_S drdz\hat{r}^2[\rho G_2^{out}]_{\phi_-}^{\phi_+} \sim -\frac{4}{3}c\int_S drdz\hat{r}^2\rho_{bs}c_1{}^{-1}q_2 \sim -\frac{2^{\frac{3}{2}}}{3}(c^2/\omega)\hat{r}_p^{-1}\hat{e}_{\varphi p}\int_{\hat{r}_<}^{\hat{r}_>} d\hat{r}\hat{r}^2(\hat{r}^2-1)^{-\frac{1}{4}}\int_{\hat{z}_{c-L_{\hat{z}}\omega/c}}^{\hat{z}_c} d\hat{z}(\hat{z}_c-\hat{z})^{-\frac{1}{2}}\rho_{bs}. \tag{46}$$

This behaves like $$\hat{r}_p^{-\frac{1}{2}}.$$

as $\hat{r}_p \to \infty$ since the $\hat{z}$-quadrature in (46) has the finite value $$2(L_{\hat{z}}\omega/c)^{\frac{1}{2}}\langle\rho_{bs}\rangle$$

in this limit [see (37) et seq.].

Hence, the electric field vector of the radiation $$E = -\nabla_p A_0 - \partial A/\partial(ct_p) \sim -c^{-1}(\partial A/\partial t_p)_{out} \sim \frac{2^{\frac{\tau}{2}}}{3}(c/\omega)\hat{r}_p^{-\frac{1}{2}}\hat{e}_{\varphi p}\int_{\hat{r}_<}^{\hat{r}_>} d\hat{r}\hat{r}^2(\hat{r}^2-1)^{-\frac{1}{4}}(L_{\hat{z}}\omega/c)^{\frac{1}{2}}\langle\rho_{bs}\rangle \tag{47}$$

itself decays like $$\hat{r}_p^{-\frac{1}{2}}$$

in the far zone: as we have already seen in Sec. IV(A), the term $\nabla_P A_0$ has the conventional rate of decay $r_p^{-1}$ and so is negligible relative to $(\partial A/\partial t_p)_{out}$.

C. Curl of the Vector Potential

There are no contributions from the limits of integration towards the curl of the integral in (41) because $\rho$ vanishes outside a finite volume and so the integral in this equation extends over all values of $(r, \hat{\varphi}, z)$. Hence, differentiation of (41) yields $$B = \nabla_P \times A = B_{in} + B_{out}, \tag{48a}$$

in which $$B_{in,out} \equiv \int_{V_{in,out}} dV \hat{r} \rho \nabla_P \times G_2^{in,out}. \tag{48b}$$

Operating with $\nabla_P \times$ on the first member of (42) and ignoring the term that decays like $r_p^{-2}$, as in (30), we find that the kernels. $\nabla_P \times G_2^{in}$ and $\nabla_P \times G_2^{out}$ of (48b) are given—in the radiation zone—by the values of $$\nabla_P \times G_2 \simeq (\omega/c)\int_{-\infty}^{+\infty} d\varphi R^{-1}\delta'(g-\varphi)\hat{n}\times\hat{e}_\varphi,\ \hat{r}_P \gg 1, \tag{49}$$

for $\varphi$ inside and outside the interval $(\varphi_-, \varphi_+)$, respectively. [$\hat{n}$ is the unit vector defined in (31).]

Insertion of (49) in (48) now yields expressions whose $\hat{\varphi}$-quadratures can be evaluated by parts to arrive at $$B_{in} \simeq \int_S drdz\hat{r}^2\left\{-[\rho G_3^{in}]_{\phi=\phi_-}^{\phi=\phi_+} + \int_{\phi_-}^{\phi_+} d\phi\partial\rho/\partial\hat{\varphi}G_3^{in}\right\},\ \hat{r}_p \gg 1, \tag{50}$$

and $$B_{out} \simeq \int_S drdz\hat{r}^2\left\{[\rho G_3^{out}]_{\phi=\phi_-}^{\phi=\phi_+} + \left(\int_{-\pi}^{\phi_-} + \int_{\phi_+}^{+\pi}\right)d\phi\partial\rho/\partial\hat{\varphi}G_3^{out}\right\},\ \hat{r}_p \gg 1, \tag{51}$$

where $G_3^{in}$ and $G_3^{out}$ stand for the values of $$G_3 = \int_{-\infty}^{+\infty} d\varphi R^{-1}\delta(g-\phi)\hat{n}\times\hat{e}_\varphi = \sum_{\varphi=\varphi_j} R^{-1}|\partial g/\partial\varphi|^{-1}\hat{n}\times\hat{e}_\varphi \tag{52}$$

inside and outside the bifurcation surface.

Once again, owing to the presence of the factor $|\partial_g/\partial\varphi|^{-1}$ in $G_3^{in}$, the first term in (50) is divergent so that the Hadamard's finite part of $B_{in}$ consists of the volume integral in this equation, an integral whose magnitude is of the order of $$\hat{r}_P^{-\frac{3}{2}}$$

[see the paragraph containing (35) and note that, according to (A38) and (A44), $p_3 \gg c_1 q_3$ and $p_3/c_1^2 = O(1)$]. The second term in (51) has—like those in (33) and (45)—the conventional rate of decay $\hat{r}_P^{-1}$. Moreover, the surface integral in (51)—which would have had the same magnitude as the surface integral in (50) and so would have cancelled out of the expression for B had $G_3^{in}$ and $G_3^{out}$ matched smoothly across the bifurcation surface—decays as slowly as the corresponding term in (45).

The asymptotic value of $G_3$ for source points close to the cusp curve of the bifurcation surface has been calculated in Appendix A. It follows from this value of $G_3$ and from (51), (52), (A40), (A44) and (A45) that, in the radiation zone, $$B \sim \int_S dr dz \hat{r}^2 [\rho G_3^{out}]_{\phi_-}^{\phi_+} \sim \frac{4}{3} \int_S dr dz \hat{r}^2 \rho_{bs} c_1^{-1} q_3 \sim \frac{2^{\frac{3}{2}}}{3} (c/\omega) \hat{r}_P^{-\frac{1}{2}} \int_{\hat{r}_<}^{\hat{r}_>} d\hat{r} \hat{r}^2 (\hat{r}^2 - 1)^{-\frac{1}{4}} \int_{\hat{z}_{c-L_{\hat{z}}\omega/c}}^{\hat{z}_c} d\hat{z} (\hat{z}_c - \hat{z})^{-\frac{1}{2}} \rho_{bs} n_3 \quad (53)$$

to within the order of the approximation entering (37) and (46).

The far-field version of the radial unit vector defined in (31) assumes the form $$\lim_{r_P \to \infty} \hat{n} \Big|_{\phi=\phi_c, \hat{z}=\hat{z}_c} = \hat{r}^{-1} \hat{e}_{rP} - (1 - \hat{r}^{-2})^{\frac{1}{2}} \hat{e}_{zP} \quad (54)$$

on the cusp curve of the bifurcation surface [see (12b), (13) and (A27), and note that the position of the observer is here assumed to be such that the segment of the cusp curve lying within the source distribution pattern is described by the expression with the plus sign in (12b), as in FIG. 6]. So, $n_3$ equals $\hat{n} \times \hat{e}_{\varphi P}$ in the regime of validity of (53) [see (A45)]. Moreover, $\hat{n}$ can be replaced by its far-field value $$\hat{n} \cong (r_P \hat{e}_{rP} + z_P \hat{e}_{zP})/R_P, \quad R_P \to \infty, \quad (55)$$

if it is borne in mind that (53) holds true only for an observer the cusp curve of whose bifurcation surface intersects the source distribution pattern.

Once $n_3$ in (53) is approximated by $\hat{n} \times \hat{e}_{\varphi P}$ and the resulting $\hat{z}$-quadrature is expressed in terms of $\langle \rho_{bs} \rangle$ [see (38)], this equation reduces to $$B \sim \hat{n} \times E, \quad (56),$$

where E is the electric field vector earlier found in (47). Equations (47) and (56) jointly describe a radiation field whose polarization vector lies along the direction of motion of the source distribution pattern, $\hat{e}_{\varphi P}$.

Note that there has been no contribution toward the values of E and B from inside the bifurcation surface. These quantities have arisen in the above calculation solely from the jump discontinuities in the values of the Green's functions $G_1^{out}$, $G_2^{out}$ and $G_3^{out}$ across the coalescing sheets of the bifurcation surface. We would have obtained the same results had we simply excised the vanishingly small volume $\lim_{r_P \to \infty} V_{in}$ from the domains of integration in (29), (43) and (48).

Note also that the way in which the familiar relation (56) has emerged from the present analysis is altogether different from that in which it appears in conventional radiation theory. Essential though it is to the physical requirement that the directions of propagation of the waves and of their energy should be the same, (56) expresses a relationship between fields that are here given by non-spherically decaying surface integrals rather than by the conventional volume integrals that decay like $r_P^{-1}$.

V. A Physical Description of the Emission Process

Expressions (47) and (56) for the electric and magnetic fields of the radiation that arises from a charge-current density with the components (23) and (39) imply the following Poynting vector:

$$S \sim \frac{2^5}{3^2} \pi^{-1} c (c/\omega)^2 r_P^{-1} \left[ \int_{\hat{r}_<}^{\hat{r}_>} d\hat{r} \hat{r}^2 (\hat{r}^2 - 1)^{-\frac{1}{4}} (L_{\hat{z}} \omega / c)^{\frac{1}{2}} \langle \rho_{bs} \rangle \right]^2 \hat{n}. \quad (57)$$

In contrast, the magnitude of the Poynting vector for the coherent cyclotron radiation that would be generated by a macroscopic lump of charge, if it moved subluminally with a centripetal acceleration cw is of the order of $(\langle \rho \rangle L^3)^2 \omega^2 / (c R_P^2)$ according to the Larmor formula, where $L_3$ represents the volume of the source distribution pattern and $\langle \rho \rangle$ its average charge density. The intensity of the present emission is therefore greater than that of even a coherent conventional radiation by a factor of the order of $(L_{\hat{z}}/L)(L\omega/c)^{-4}(R_P/L)$, a factor that ranges from $10^{16}$ to $10^{30}$ in the case of pulsars for instance.

The reason this ratio has so large a value in the far field ($R_P/L \gg 1$) is that the radiative characteristics of a volume-distributed source pattern which moves faster than the waves it emits are radically different from those of a corresponding source that moves more slowly than the waves it emits. There are elements of the distirbution pattern of the source in the former case that approach the observer along the radiation direction with the wave speed at the retarded time. These lie on the intersection of the source distribution pattern with what we have here called the bifurcation surface of the observer (see FIGS. 5 and 6): a surface issuing from the position of the observer which has the same shape as the envelope of the wave fronts emanating from an element of the source distribution pattern (FIGS. 1 and 3A) but which spirals around the rotation axis in the opposite direction to this envelope and resides in the space of source points instead of the space of observation points.

The elements of the source distribution pattern inside the bifurcation surface of an observer make their contributions towards the observed field at three distinct instants of the retarded time. The values of two of these retarded times coincide for an interior element of the source distribution pattern that lies next to the bifurcation surface. This limiting value of the coincident retarded times represents the instant at which the component of the velocity of the element in question of the source distribution pattern equals the wave speed c in the direction of the observer. The third retarded time at which an element of the source distribution pattern adjacent to—just inside—the bifurcation surface makes a contribution is the same as the single retarded time at which its neighbouring element of the source distribution pattern just outside the bifurcation surface makes its contribution towards the observed field. (The elements of the source distribution pattern outside the bifurcation surface make their contributions at only a single instant of the retarded time).

At the instant marked by this third value of the retarded time, the two neighbouring elements of the source distribution pattern—just interior and just exterior to the bifurcation surface—have the same velocity, but a velocity whose component along the radiation direction is different from c. The velocities of these two neighbouring elements are, of course, equal at any time. However, at the time they approach the observer with the wave speed, the element inside the bifurcation surface makes a contribution towards the observed field while the one outside this surface does not: the observer is located just inside the envelope of the wave fronts that emanate from the interior element of the source distribution pattern but just outside the envelope of the wave fronts that emanate from the exterior one. Thus, the constructive interference of the waves that are emitted by the element of the source distribution pattern just outside the bifurcation surface takes place along a caustic which at no point propagates past the observer at the conical apex of the bifurcation surface in question.

On the other hand, the radiation effectiveness of an element of the distribution pattern of the source which approaches the observer with the wave speed at the retarded time is much greater than that of a neighbouring element the component of whose velocity along the radiation direction is subliminal or superluminal at this time. This is because the piling up of the emitted wave fronts along the line joining the source and the observer makes the ratio of emission to reception time intervals for the contributions of the luminally moving elements of the source distribution pattern by many orders of magnitude greater than that for the contributions of any other elements. As a result, the radiation effectiveness of the various constituent elements of the source distribution pattern (i.e. the Green's function for the emission process) undergoes a discontinuity across the boundary set by the bifurcation surface of the observer.

The integral representing the superposition of the contributions of the various volume elements of the source distribution pattern to the potential thus entails a discontinuous integrand. When this volume integral is differentiated to obtain the field, the discontinuity in question gives rise to a boundary contribution in the form of a surface integral over its locus. This integral receives contributions from opposite faces of each sheet of the bifurcation surface which do not cancel one another. Moreover, the contributions arising from the exterior faces of the two sheets of the bifurcation surface do not have the same value even in the limit $R_p\rightarrow\infty$. where this surface is infinitely large and so its two sheets are—throughout a localized source distribution pattern that intersects the cusp—coalescent. Thus the resulting expression for the field in the radiation zone entails a surface integral such as that which would arise if the source distribution pattern were two-dimensional, i.e. if the source distribution pattern were concentrated into an infinitely thin sheet that coincided with the intersection of the coalescing sheets of the bifurcation surface with the source distribution pattern.

For a two-dimensional source distribution pattern of this type—whether it be real or a virtual one whose field is described by a surface integral—the near zone (the Fresnel regime) of the radiation can extend to infinity, so that the amplitudes of the emitted waves are not necessarily subject to the spherical spreading that normally occurs in the far zone (the Fraunhofer regime). The Fresnel distance which marks the boundary between these two zones is given by $R_F\sim L_\perp^2/L_\parallel$, in which $L_\perp$ and $L_\parallel$ are the dimensions of the source distribution pattern perpendicular and parallel to the radiation direction. If the distribution pattern of the source is distributed over a surface and so has a dimension $L_\parallel$ that is vanishingly small, therefore, the Fresnel distance $R_F$ tends to infinity.

In the present case, the surface integral which arises from the discontinuity in the radiation effectiveness of the source elements across the bifurcation surface has an integrand that is in turn singular on the cusp curve of this surface. This has to do with the fact that the elements the source distribution pattern on the cusp curve of the bifurcation surface approach the observer along the radiation direction not only with the wave speed but also with zero acceleration. The ratio of the emission to reception time intervals for the signals generated by these elements is by several orders of magnitude greater even than that for the elements on the bifurcation surface. When the contributions of these elements are included in the surface integral in question, i.e. when the observation point is such that the cusp curve of the bifurcation surface intersects the source distribution pattern (as shown in FIG. 6), the value of the resulting improper integral turns out to have the dependence $R_p^{-1/2}$, rather than $R_p^{-1}$, on the distance $R_p$ of the observer from the source distribution pattern.

This non-spherically decaying component of the radiation is in addition to the conventional component that is concurrently generated by the remaining volume elements of the source distribution pattern. It is detectable only at those observation points the cusp curves of whose bifurcation surfaces intersect the source distribution pattern. It appears, therefore, as a spiral-shaped wave packet with the same azimuthal width as the $\hat{\varphi}$-extent of the source distribution pattern. For a source distribution pattern whose superluminal portion extends from $\hat{r}=1$ to $\hat{r}=\hat{r}_>>1$, this wave packet is detectable—by an observer at infinity—within the angles $$\frac{1}{2}\pi-\arccos\hat{r}_>^{-1}\leq\theta p\leq\frac{1}{2}\pi+\arccos\hat{r}_>^{-1}$$

from the rotation axis: projection (12b) of the cusp curve of the bifurcation surface onto the (r, z)-plane reduces to $$\cot\theta p=(\hat{r}^2-1)^{\frac{1}{2}}$$

in the limit $R_P\rightarrow\infty$, where $\theta_P\equiv\arctan(r_P/z_P)$ [also see (54)].

Because it comprises a collection of the spiralling cusps of the envelopes of the wave fronts that are emitted by various elements of the source distribution pattern, this wave packet has a cross section with the plane of rotation whose extent and shape match those of the source distribution pattern. It is a diffraction-free propagating caustic that—when detected by a far-field observer—would appear as a pulse of duration $\Delta\hat{\varphi}/\omega$, where $\Delta\hat{\varphi}$ is the azimuthal extent of the source distribution pattern.

Note that the waves that interfere constructively to form each cusp, and hence the observed pulse, are different at different observation times: the constituent waves propagate in the radiation direction $\hat{n}$ with the speed c, whereas the propagating caustic that is observed, i.e. the segment of the cusp curve that passes through the observation point at the observation time, propagates in the azimuthal direction $\hat{e}_{\varphi P}$ with the phase speed $r_{pw}$.

The fact that the intensity of the pulse decays more slowly than predicted by the inverse square law is not therefore incompatible with the conservation of energy, for it is not the same wave packet that is observed at different distances from the source distribution pattern: the wave packet in question is constantly dispersed and re-constructed out of other waves. The cusp curve of the envelope of the wavefronts emanating from an infinitely long-lived source distribution pattern is detectable in the radiation zone not because any segment of this curve can be identified with a caustic that has formed at the source and has subsequently travelled as an isolated wavepacket to the radiation zone, but because certain set of waves superpose coherently only at infinity.

Relative phases of the set of waves that are emitted during a limited time interval is such that these waves do not, in general, interfere constructively to form a cusped envelope until they have propagated some distance away from the source distribution pattern. The period in which this set of waves has a cusped envelope and so is detectable as a periodic train of non-spherically decaying pulses, would of course have a limited duration if the source distribution pattern is short-lived.

Thus, pulses of focused waves may be generated by the present emission process which not only are stronger in the far field than any previously studied class of signals, but which can in addition be beamed at only a select set of observers for a limited interval of time.

VI. Description of Examples of the Apparatus

Figure 7A:
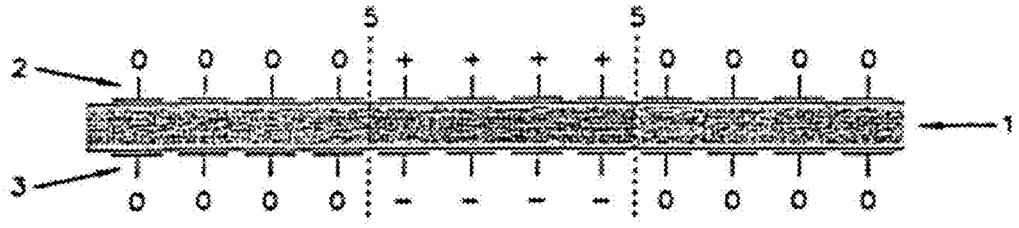
FIGS. 7A and 7B are views of two examples of the apparatus of the present invention showing the dielectric substrate, the electrodes and a superluminally moving polarised region of the dielectric substrate.
Figure 7B:
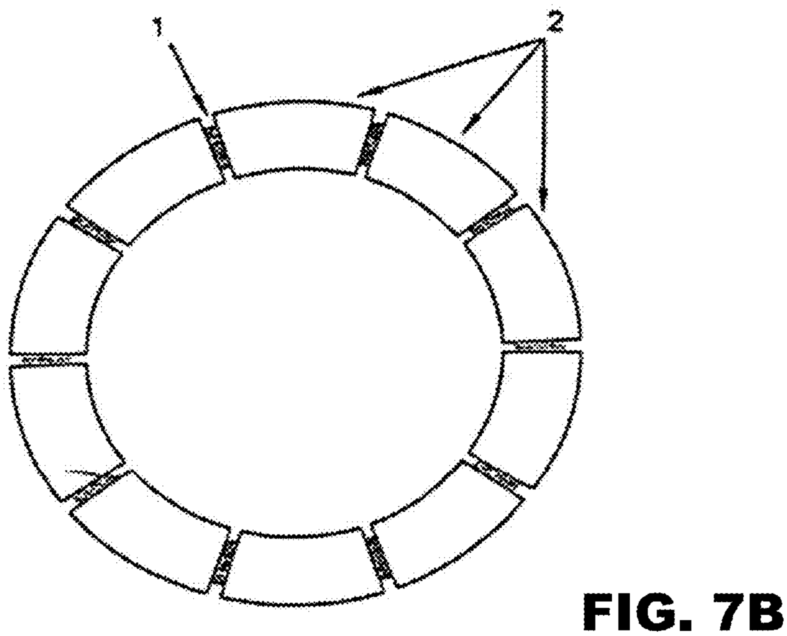

An apparatus can be designed for generating such pulses, in accordance with the above theory, which basically entails the simple components shown in FIGS. 7A and 7B.

Referring to the example of FIG. 7A, a linear dielectric rod 1 of length/is provided with an array of electrodes 2, 3 arranged opposite one another along its length with n/l electrodes per unit length. In use, a voltage potential is applied across the dielectric rod 1 by the electrodes 2, 3, with each pair of electrodes 2, 3, in the array being activated in turn to generate a polarisation region with the fronts 5. By rapid application and removal of a potential voltage to electrodes 2, 3, the distribution pattern of this polarised region can be set in accelerated motion with a superluminal velocity. Creating a voltage across a pair of electrodes polarises the material in the rod between the electrodes. The electrodes can be controlled independently, so that the distribution pattern of polarisation of the rod as a function of length along the rod is controlled.

By varying the voltage across the electrode pairs as a function of time, this polarisation pattern is set in motion. For example, neighbouring electrode pairs can be turned on with a time interval of $\Delta t$ between them, starting from one end of the rod. Thus, at a snapshot in time, part of the rod is polarised (that part lying between electrode pairs with a voltage across them) and part of it is not polarised (that part lying between electrode pairs without a voltage across them). These regions are separated by "polarisation fronts" which move with a speed of $l/(n\Delta t)$. With suitable choices of n and $\Delta t$ the polarisation fronts can be made to move at any speed (including speeds faster than the speed of light in vacuo). The polarisation fronts can be accelerated through the speed of light by changing $\Delta t$ with time.

High-frequency radiation may be generated by modulating the amplitude of the resulting polarisation current with a frequency $\Omega$ that exceeds a/c, where a is the acceleration of the source distribution pattern. The spectrum of the spherically decaying component of the radiation would then extend to frequencies that would be by a factor of the order of $(c\Omega/a)^2$ higher than $\Omega$. The required modulation may be achieved by varying the amplitudes of the voltages that are applied across various electrode pairs all in phase.

Figure 3B:
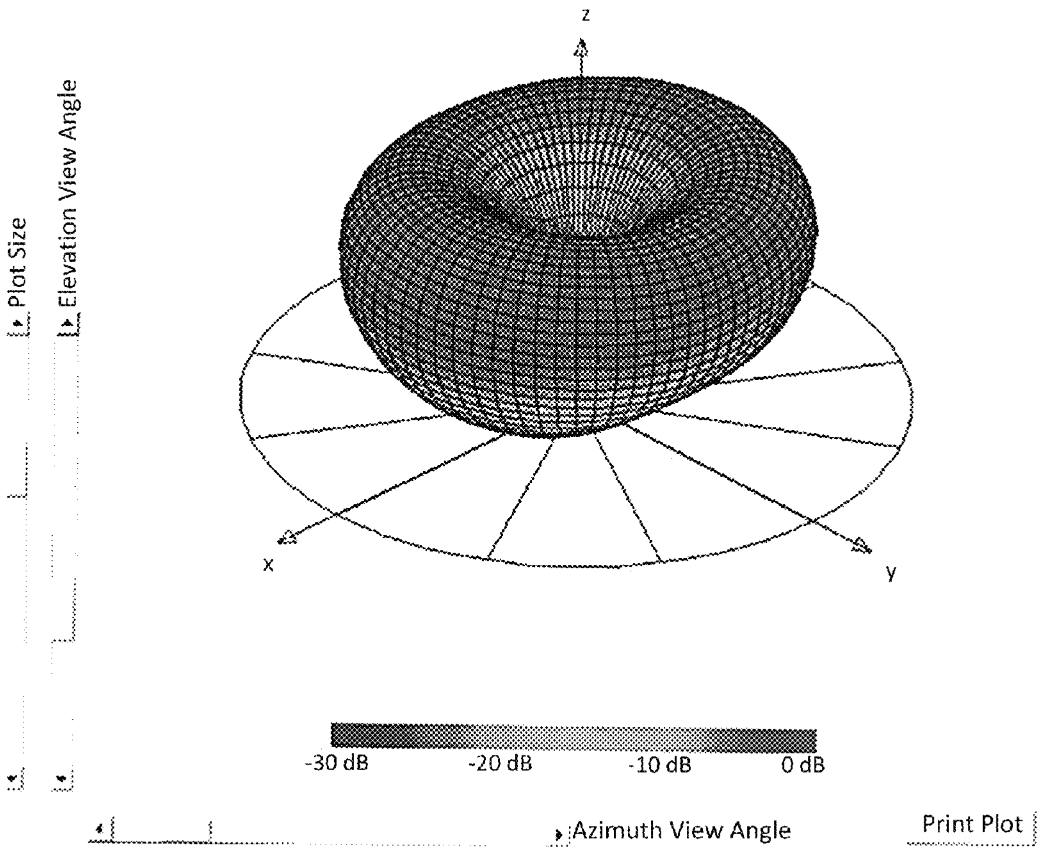
FIG. 3B is a representative three dimensional plot of the radiation pattern of the entire source of FIG. 7B at a frequency of 2.4 GHz and a phase difference between adjacent electrodes of 15 degrees.
Figure 3C:
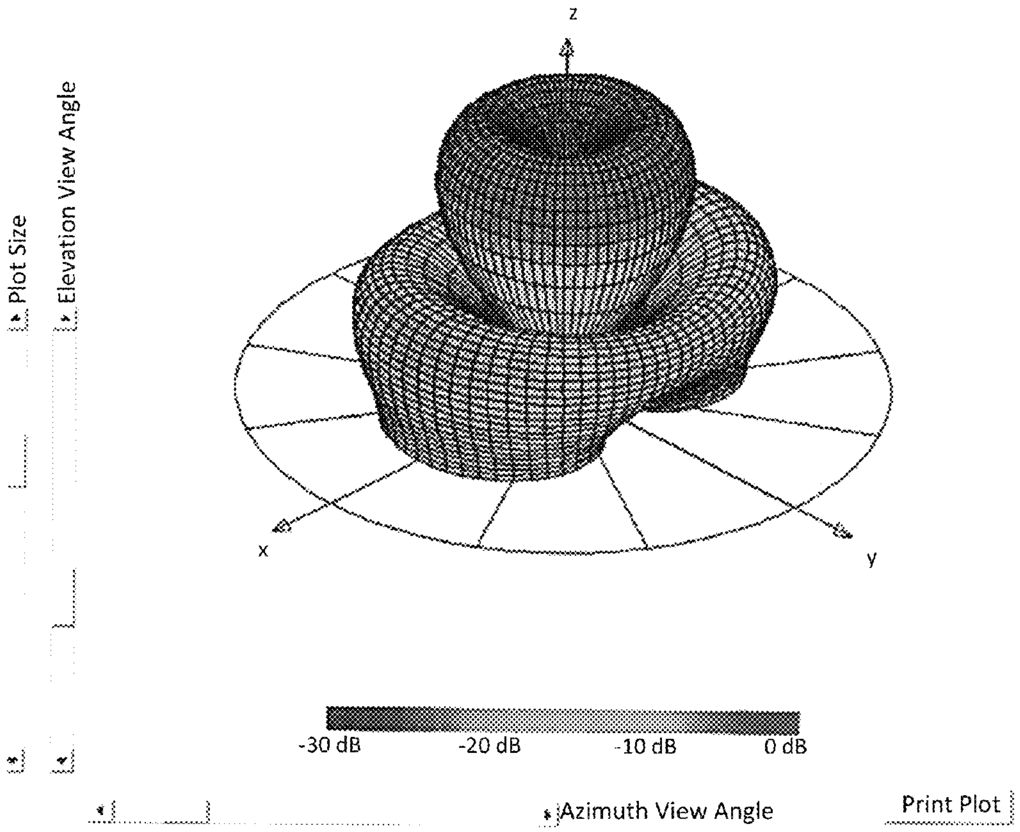
FIG. 3C is a representative three dimensional plot of the radiation pattern of the entire source of FIG. 7B at a frequency of 2.4 GHz and a phase difference between adjacent electrodes of 5 degrees.

FIG. 7B shows another example of the invention, the one analysed above. In this example, the dielectric rod is formed in the shape of a ring. FIG. 7B is a plan view showing electrodes 2, and has electrodes 3 disposed below the rod 1. For a ring of radius r and a polarisation pattern that moves around the ring with an angular frequency $\omega$, the velocity of the charged region is $r\omega$. In this example, $r\omega$ is greater than the speed of light c so that the moving polarisation pattern emits the radiation described with reference to FIGS. 1 to 6. FIGS. 3B and 3C depict representative three dimensional plots of the radiation pattern of the entire source of FIG. 7B at a frequency of 2.4 GHz and a phase difference between adjacent electrodes between 15 degrees and 5 degrees respectively. An azimuthal or radial polarisation current may be produced by displacing the plates of each electrode pair relative to one another.

The voltages across neighbouring electrode pairs have the same time dependence (their period is $2\pi/\omega$) but, as in the rectilinear case, there is a time difference of $\Delta t$ between them. The polarisation distribution pattern must move coherently around the ring, i.e. must move rigidly with an unchanging shape; this would be the case if $n\Delta t=2\pi N/\omega$, where n is the number of electrodes around the ring and N an integer. Within the confines of this condition, the time dependence of the voltage across each pair of electrodes can be chosen at will. The exact form of the adopted time dependence would allow, for example, the generation of harmonic content and structure in the source distribution pattern. As in the rectilinear case, modulation of the amplitude of this source distribution pattern at a frequency $\Omega$ would result in a radiation whose spectrum would contain frequencies of the order of $(\Omega/\omega)^2\Omega$.

The electrodes are driven by an array of similar oscillators, an array in which the phase difference between successive oscillators has a fixed value. There are several ways of implementing this:

a single oscillator may be used to drive each electrode through progressively longer delay lines;

each electrode pair may be driven by an individual oscillator in an array of phase-locked oscillators; or the electrode pairs may be connected to points around a circle of radius r which lies within—and is coplanar with—an annular waveguide, a waveguide whose normal modes include an electromagnetic wave train that propagates longitudinally around the circle with an angular frequency $\omega > c/r$.

For a dielectric rod in the shape of a ring of diameter 1 m, oscillators operating at a frequency of 100 MHz would generate a superluminally moving polarisation distribution pattern. The required oscillator frequencies are easily obtainable using standard laboratory equipment, and any material with an appreciable polarizability at MHz frequencies would do for the medium. If the amplitude of the resulting polarisation current is in addition modulated at 1 GHz, then the device would radiate at ~100 GHz. The efficiency of this emission process is expected to be as high as a few percent.

With oscillators operating at frequencies of 1 GHz (also available), the size of the device would be about 10 cm across; applications demanding portability are therefore viable.

VII. Applications

A. Medical and Biomedical Applications

The present invention may be exploited to generate waves which do not form themselves into a focused pulse until they arrive at their intended destination and which subsequently remain in focus only for an adjustable interval of time, a property that allows for applications in various areas of medical practice and biomedical research.

Examples of its use in therapeutic medicine are: (i) the selective irradiation of deep tumours whilst sparing surrounding normal tissue, and (ii) the radiation pressure or thermocautery removal of thrombotic and embolic vascular lesions that may result from abnormalities in blood clotting without invasive surgery. Examples of its use in diagnostic medicine are absorption spectroscopy (focusing a broadband pulse within a tissue some frequencies of which would be absorbed) and three-dimensional tomography (mapping specifiable regions of interest within the body to high levels of resolution). In biomedical research, it provides a more powerful alternative to confocal scanning microscopy; with a single aerial being used as an X-ray source for imaging purposes.

An example of an apparatus required for generating the pulses in question is that shown in FIG. 7A. It consists of a linear dielectric rod, an array of electrode pairs positioned opposite to each other along the rod, and the means for applying a voltage to the electrodes sequentially at a rate sufficient to induce a polarization current whose distribution pattern moves along the rod with a constant acceleration at speeds exceeding the speed of light in vacuo.

Figure 8:
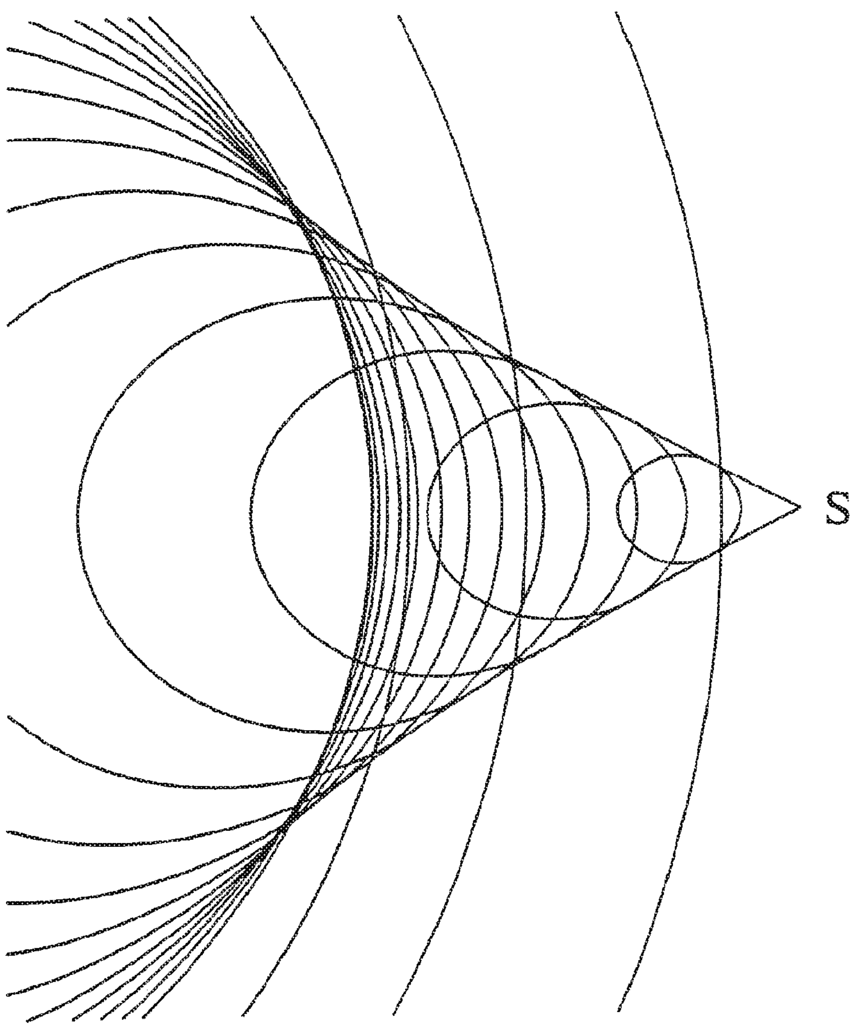
FIG. 8 is a diagram showing the wave fronts, and the envelope of the wave fronts, of the electromagnetic emission from a particular volume element (source point) S within the rectilinearly moving, accelerating distribution pattern of the superluminal source generated by the present invention.
Figure 9A:
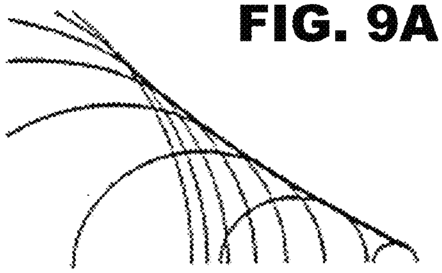
FIGS. 9A-9F show the evolution in observation time of the relative positions and the envelope of a set of wave fronts emitted during a limited interval of (retarded time; the snapshots 9A-9F include times at which the envelope has not yet developed a cusp [9A and 9B], has a cusp [9C-9E], and has already lost its cusp 9F.
Figure 9B:
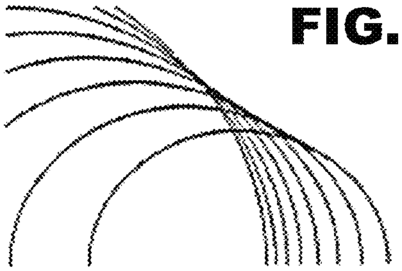
Figure 9C:
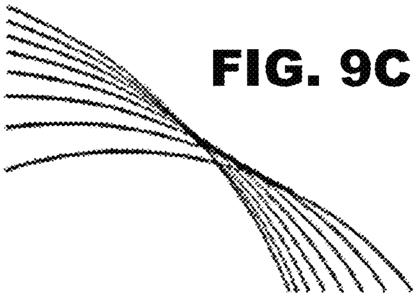
Figure 9D:
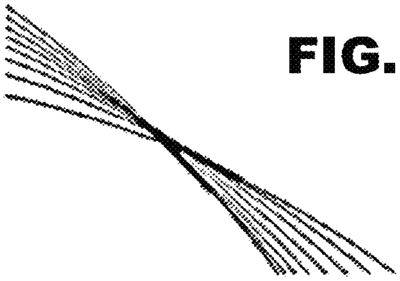
Figure 9E:
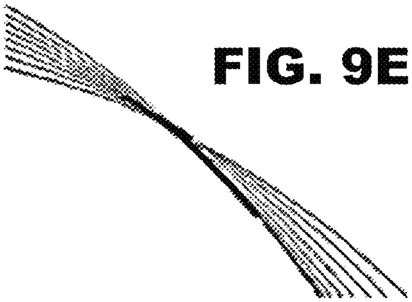
Figure 9F:
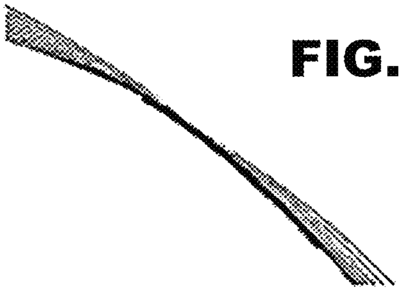

The envelope of the wave fronts emanating from a volume element of the superluminally moving distribution pattern thus produced is shown in FIG. 8. It consists of a two-sheeted closed surface when the duration of the source includes the instant at which the distribution pattern of the source becomes superluminal. The two sheets of this envelope are tangent to one another and form a cusp along an expanding circle. If the source distribution pattern has a limited duration, the envelope in question is correspondingly limited [as in FIG. 9D] to only a truncated section of the surface shown in FIG. 8.

The snapshots in FIGS. 9A-9F trace the evolution in time of the relative positions of a particular set of wave fronts that are emitted during a short time interval. They include times at which the envelope has not yet developed a cusp [9A and 9B], has a cusp [9C-9E], and has already lost its cusp 9F.

A source distribution pattern with the life span $0<t<T$ gives rise to a caustic, i.e. to a set of tangential wave fronts with a cusped envelope, only during the following finite interval of observation time:

$$M(M^2-1)l/c \le t_P \le M[M^2(1+aT/u)^3-1]l/c, \tag{58}$$

where $M\equiv u/c$ and $l\equiv c^2/a$ with u, c, and a standing for the speed of the distribution pattern of the source at $t=0$, the wave speed, and the constant acceleration of the distribution pattern of the source, respectively. For a $T/u\ll 1$, therefore, the duration of the caustic, $3M^2T$, is proportional to that of the source distribution pattern.

Moreover, a cusped envelope begins to form in the case of a short-lived source distribution pattern only after the waves have propagated a finite distance away from the source. The distance of the caustic from the position of the source distribution pattern at the retarded time is given by $$\tilde{R}p = \beta p^{\frac{1}{3}}\left(\beta p^{\frac{2}{3}} - 1\right)l, \tag{59}$$

where $\beta_P\equiv(u+at_P)/c$ and $t_p$ is the observation time. This distance can be long even when the duration of the source distribution pattern is short because there is no upper limit on the value of the length $l(\equiv c^2/a)$ that enters (58) and (59):/tends to infinity for $a\rightarrow 0$ and is as large as $10^{18}$ cm when a equals the acceleration of gravity. Thus $R_P$ can be rendered arbitrarily large, by a suitable choice of the parameter I, without requiring either the duration of the source (T) or the retarded value $$\left(\beta p^{\frac{1}{3}}c\right)$$

of the speed of the source distribution pattern to be correspondingly large.

This means that, when either M or I is large, the waves emitted by a short-lived source do not focus to such an extent as to form a cusped envelope until they have travelled a long distance away from the source. The period during which they then do so can be controlled by adjusting the parameters M and T.

The collection of the cusp curves of the envelopes that are associated with various elements of the distribution pattern of the source constitutes a ring-shaped wave packet. This wave packet is intercepted only by those observers who are located, during its life time (58), on its trajectory $$\xi = \left(\beta p^{\frac{2}{3}} - 1\right)^{\frac{3}{2}}, \zeta = \frac{1}{2}\beta p^2 - \frac{3}{2}\beta p^{\frac{3}{2}} + 1, \tag{60}$$

where ξ represents the distance (in units of I) of the observer from the rectilinear path of the source, say the z-axis, and ζ stands for the difference between the Lagrangian coordinates $$\hat{z} = z - ut - \frac{1}{2}at^2$$

of the source point and $$\hat{z}_P = z_P - utp - \frac{1}{2}atp^2$$

of the observation point.

It is possible to limit the spatial extent of the wave packet embodying the large-amplitude pulse by enclosing the path of the source distribution pattern within an opaque cylindrical surface which has a narrow slit parallel to its axis, a slit acting as an aperture that would only allow an arc of the ring-shaped wave packet to propagate to the far field. The volume occupied by the resulting wave packet could then be chosen at will by adjusting the width of the aperture and the longitudinal extent of the source distribution pattern.

B. Compact Sources of Intense Broadband Radiation

In the near zone, the radiation that is generated by the invention can be arranged to have many features in common with synchrotron radiation. Most experiments presently carried out at large-scale synchrotron facilities could potentially be performed by means of a polarization synchrotron, i.e. the compact device described in Sec. VI. This device has applications, as a source of intense broadband radiation, in many scientific and industrial areas, e.g. in spectroscopy, in semiconductor lithography at very fine length scales, and in silicon chip manufacture involving UV techniques.

The spectrum of the radiation generated in a polarization synchrotron extends to frequencies that are by a factor of the order of $(c\Omega/a)^2$ higher than the characteristic frequency Ω of the fluctuations of the source distribution pattern itself (c and a are the speed of light and the acceleration of the source distribution pattern, respectively). For a polarizable medium consisting of a 1 m arc of a circular rod whose diameter is ~10 m [see FIG. 7B], superluminal source distribution pattern motion is achieved by an applied voltage that oscillates with the frequency ~10 MHz. If the amplitude of the resulting polarization current is in addition modulated at ~500 MHz, then the device would radiate at ~1 THz.

In the case of the source distribution pattern elements that approach the observer with the wave speed and zero acceleration, the interval of retarded time δt during which a set of waves are emitted is significantly longer than the interval of observation time $\delta t_P$ during which the same set of waves are received.

For a rectilinearly moving superluminal source distribution pattern, the ratio $\delta t/\delta t_P$ is given by $$2^{\frac{1}{3}}(u^2/c^2-1)^{\frac{1}{3}}(a\delta tp/c)^{-\frac{2}{3}},$$

where u is the retarded speed of the source distribution pattern and a its constant acceleration. This ratio increases without bound as a approaches zero. Regardless of what the characteristic frequency of the temporal fluctuations of the source may be, therefore, it is possible to push the upper bound to the spectrum of the emitted radiation to arbitrarily high frequencies by making the acceleration a small. [Note that the emission process described here remains different from the Ĉerenkov process, in which a exactly equals zero, even in the limit a→0.]

The relationship between δt and $\delta t_P$ is $$\delta tp \simeq \frac{1}{6}\omega^2(\delta t)^3$$

if the source distribution pattern moves circularly with the angular frequency w. Thus the spectrum of the spherically decaying part of the radiation that is generated by a source with an accelerated superluminal distribution pattern extends to frequencies which are by a factor of the order of $(c\Omega/a)^2$ or $(\Omega/\omega)^2$ higher than the characteristic frequency Ω of the modulations of the amplitude of the source distribution pattern.

C. Long-Range and High-Bandwidth Telecommunications

There are at present no known antennas in which the emitting electric current is both volume distributed and has the time dependence of a travelling wave with an accelerated superluminal motion. A travelling wave antenna of this type, designed on the basis of the principles underlying the present invention, generates focused pulses that not only are stronger in the far field than any previously studied class of signals, but can in addition be beamed at only a select set of observers for a limited interval of time: the constituent waves whose constructive interference gives rise to the propagating wave packet embodying a given pulse come into focus (develop a cusped envelope or a caustic) only long after they have emanated from the source and then only for a finite period (FIGS. 9A-9F).

The intensity of the waves generated by this novel type of antenna decay much more slowly over distance than that of conventional radio or light signals. In the case of conventional sources, including lasers, if the transmitter (source) to receiver (destination) distance doubles, the power of the signal is reduced by a factor of four. With the present invention, the same doubling of distance only halves the available signal. Thus the power required to send a radio signal from the Earth to the Moon by the present transmitter would be 100 million times smaller than that which is needed in the case of a conventional antenna.

The emission mechanism in question can therefore be used to convey telephonic, visual and other electronic data over very long distances without significant attenuation. In the case of ground-to-satellite communications, the power required to beam a signal would be greatly reduced, implying that either far fewer satellites would be required for the same bandwidth or each satellite could handle a much wider range of signals for the same power output.

D. Hand-Held Communication Devices

A combined effect of the slow decay rate and the beaming of the new radiation is that a network of suitably constructed antennae could expand the useable spectrum of terrestrial electromagnetic broadcasts by a factor of a thousand or more, thus dispensing with the need for cable or optical fibre for high-bandwidth communications.

The evolution of the Internet, real-time television conferencing and related information-intense communication media means that there is a growing demand for cheap high-bandwidth aerials. Highly compact aerials for hand-held portable phones and/or television/Internet connections based on the present invention can handle, not only much longer transmitter-to-receiver distances than those currently available in cellular phone systems, but also much higher bandwidth.

Far fewer ground based aerial structures are required to obtain the same area coverage. Because there would be no cross-talk between any pairs of transmitter and receiver, the effective bandwidth of free space could be increased many thousand-fold, thus allowing, say, for video transmission between hand-held units.

Appendix A: Asymptotic Expansion of the Green's Functions

In this Appendix, we calculate the leading terms in the asymptotic expansions of the integrals (16), (34), (42) and (52) for small $\varphi_+-\varphi_-$, i.e. for points close to the cusp curve (12) of the bifurcation surface (or of the envelope of the wavefronts). The method—originally due to Chester et al. (Proc. Camb. Phil. Soc., 54, 599, 1957)—which we use is a standard one that has been specifically developed for the evaluation of radiation integrals involving caustics (see Ludwig, Comm. Pure Appl. Maths, 19, 215, 1966). The integrals evaluated below all have a phase function $g(\varphi)$ whose extrema ($\varphi=\varphi_\pm$) coalesce at the caustic (12).

As long as the observation point does not coincide with the source point, the function g(φ) is analytic and the following transformation of the integration variables in (16) is permissible:

$$g(\varphi)=\frac{1}{3}v^3-c_1^2v+c_2, \tag{A1}$$

where v is the new variable of integration and the coefficients $$c_1\equiv\left(\frac{3}{4}\right)^{\frac{1}{3}}(\phi_+-\phi_-)^{\frac{1}{3}}\text{ and }c_2\equiv\frac{1}{2}(\phi_++\phi_-) \tag{A2}$$

are chosen such that the values of the two functions on opposite sides of (A1) coincide at their extrema. Thus an alternative exact expression for $G_0$ is $$G_0=\int_{-\infty}^{+\infty}dvf_0(v)\delta\left(\frac{1}{3}v^3-c_1^2v+c_2-\phi\right), \tag{A3}$$

in which $$f_0(v)\equiv R^{-1}d\varphi/dv. \tag{A4}$$

Close to the cusp curve (12), at which $c_1$ vanishes and the extrema $v=\pm c_1$ of the above cubic function are coincident, $f_0(v)$ may be approximated by $p_0+q_0v$, with $$p_0=\frac{1}{2}\left(f_0|_{v=c_1}+f_0|_{v=-c_1}\right), \tag{A5}$$

and $$q_0=\frac{1}{2}c_1^{-1}\left(f_0|_{v=c_1}-f_0|_{v=-c_1}\right). \tag{A6}$$

The resulting expression $$G_0\sim\int_{-\infty}^{+\infty}dv(p_0+q_0v)\delta\left(\frac{1}{3}v^3-c_1^2v+c_2-\phi\right) \tag{A7}$$

will then constitute, according to the general theory, the leading term in the asymptotic expansion of $G_0$ for small $c_1$.

To evaluate the integral in (A7), we need to know the roots of the cubic equation that follows from the vanishing of the argument of the Dirac delta function in this expression. Depending on whether the observation point is located inside or outside the bifurcation surface (the envelope), the roots of $$\frac{1}{3}v^3-c_1^2v+c_2=0 \tag{A8}$$

are given by $$v=2c_1\cos\left(\frac{2}{3}n\pi+\frac{1}{3}\arccos\chi\right),\quad |\chi|<1, \tag{A9a}$$

for n=0, 1 and 2, or by $$v=2c_1\,\mathrm{sgn}(\chi)\cosh\left(\frac{1}{3}\mathrm{arccosh}|\chi|\right),\quad |\chi|>1, \tag{A9b}$$

respectively, where:

$$\chi\equiv\left[\phi-\frac{1}{2}(\phi_++\phi_-)\right]\Big/\left[\frac{1}{2}(\phi_+-\phi_-)\right]=\frac{3}{2}(\phi-c_2)/c_1^3. \tag{A10}$$

Note that X equals +1 on the sheet $\varphi=\varphi_+$ of the bifurcation surface (the envelope) and −1 on $\varphi=\varphi_-$.

The integral in (A7), therefore, has the following value when the observation point lies inside the bifurcation surface (the envelope):

$$\int_{-\infty}^{+\infty}dv\delta\left(\frac{1}{3}v^3-c_1^2v+c_2\right)=\sum_{n=0}^{2}c_1^{-2}\left|4\cos^2\left(\frac{2}{3}n\pi+\frac{1}{3}\arccos\chi\right)-1\right|^{-1},\quad |\chi|<1. \tag{A11}$$

Using the trignometric identity 4 $\cos^2\alpha-1=\sin 3\alpha/\sin\alpha$, we can write this as $$\int_{-\infty}^{+\infty}dv\delta\left(\frac{1}{3}v^3-c_1^2v+c_2\right)=c_1^{-2}(1-\chi^2)^{-\frac{1}{2}}\sum_{n=0}^{2}\left|\sin\left(\frac{2}{3}n\pi+\frac{1}{3}\arccos\chi\right)\right|=2c_1^{-2}(1-\chi^2)^{-\frac{1}{2}}\cos\left(\frac{1}{3}\arcsin\chi\right),\quad |\chi|<1, \tag{A12}$$

in which we have evaluated the sum by adding the sine functions two at a time.

When the observation point lies outside the bifurcation surface (the envelope), the above integral receives a contribution only from the single value v given in (A9b) and we obtain $$\int_{-\infty}^{+\infty}dv\delta\left(\frac{1}{3}v^3-c_1^2v+c_2\right)=c_1^{-2}(\chi^2-1)^{-\frac{1}{2}}\sinh\left(\frac{1}{3}\mathrm{arccosh}|\chi|\right),\quad |\chi|>1, \tag{A13}$$

where this time we have used the identity 4 cos $h^2\alpha-1=\sin h\,3\alpha/\sin h\alpha$.

The second part of the integral in (A7) can be evaluated in exactly the same way. It has the value $$\int_{-\infty}^{+\infty}dvv\delta\left(\frac{1}{3}v^3-c_1^2v+c_2\right)=2c_1^{-1}(1-\chi^2)^{-\frac{1}{2}}\sum_{n=0}^{2}\left|\sin\left(\frac{2}{3}n\pi+\frac{1}{3}\arccos\chi\right)\right|\times\cos\left(\frac{2}{3}n\pi+\frac{1}{3}\arccos\chi\right)= \tag{A14}$$

-continued $$-2c_1^{-1}(1-\chi^2)^{-\frac{1}{2}}\sin\left(\frac{2}{3}\arcsin\chi\right),$$

$$|\chi|<1,$$

when the observation point lies inside the bifurcation surface (the envelope), and the value $$\int_{-\infty}^{+\infty} dv v\delta\left(\frac{1}{3}v^3 - c_1^2 v + c_2\right) = c_1^{-1}(\chi^2-1)^{-\frac{1}{2}}\mathrm{sgn}(\chi)\sinh\left(\frac{2}{3}\mathrm{arccosh}|\chi|\right), \quad |\chi|>1, \tag{A15}$$

when the observation point lies outside the bifurcation surface (the envelope).

Inserting (A12)-(A15) in (A7), and denoting the values of $G_0$ inside and outside the bifurcation surface (the envelope) by $G_0^{in}$ and $G_0^{out}$, we obtain $$G_0^{in} \sim 2c_1^{-2}(1-\chi^2)^{-\frac{1}{2}}\left[p_0\cos\left(\frac{1}{3}\arcsin\chi\right) - c_1 q_0 \sin\left(\frac{2}{3}\arcsin\chi\right)\right], \quad |\chi|<1, \text{ and} \tag{A16}$$

$$G_0^{out} \sim c_1^{-2}(\chi^2-1)^{-\frac{1}{2}}\left[p_0\sinh\left(\frac{1}{3}\mathrm{arccosh}|\chi|\right) + c_1 q_0 \mathrm{sgn}(\chi)\sinh\left(\frac{2}{3}\mathrm{arccosh}|\chi|\right)\right], \quad |\chi|>1, \tag{A17}$$

for the leading terms in the asymptotic approximation to $G_0$ for small $c_1$.

The function $f_0(v)$ in terms of which the coefficients $p_0$ and $q_0$ are defined is indeterminate at $v=c_1$ and $v=-c_1$: differentiation of (A1) yields $d\varphi/d\upsilon=(\upsilon^2-c_1^2)/(\partial_g/\partial\varphi)$ the zeros of whose denominator at $\varphi=\varphi_-$ and $\varphi=\varphi_+$ respectively coincide with those of its numerator at $v=+c_1$ and $v=-c_1$. This indeterminacy can be removed by means of l'Hopital's rule by noting that $$\left.\frac{d\varphi}{dv}\right|_{v=\pm c_1} = \left.\frac{v^2-c_1^2}{\frac{\partial g}{\partial\varphi}}\right|_{v=\pm c_1} = \left.\frac{2v}{\left(\frac{\partial^2 g}{\partial\varphi^2}\right)\left(\frac{d\varphi}{dv}\right)}\right|_{v=\pm c_1}, \tag{A18}$$

i.e. that $$\left.\frac{d\varphi}{dv}\right|_{v=\pm c_1} = \left.\left(\frac{\pm 2c_1}{\frac{\partial^2 g}{\partial\varphi^2}}\right)^{\frac{1}{2}}\right|_{\varphi=\varphi_\mp} = \frac{(2c_1\hat{R}_\mp)^{\frac{1}{2}}}{\Delta^{\frac{1}{2}}}, \tag{A19}$$

in which we have calculated $(\partial^2_g/\partial\varphi^2)$ from (7) and (8). The right-hand side of (A19) is, in turn, indeterminate on the cusp curve of the bifurcation surface (the envelope) where $c_1=\Delta=0$. Removing this indeterminacy by expanding the numerator in this expression in powers of $$\Delta^{\frac{1}{4}},$$

we find that $d\varphi/d\upsilon$ assumes the value $$2^{\frac{1}{3}}$$

at the cusp curve.

Hence, the coefficients $p_0$ and $q_0$ that appear in the expressions (A8) and (A9) for $G_0$ are explicitly given by $$p_0 = (\omega/c)\left(\frac{1}{2}c_1\right)^{\frac{1}{2}}\left(\hat{R}_-^{-\frac{1}{2}} + \hat{R}_+^{-\frac{1}{2}}\right)\Delta^{-\frac{1}{4}} \tag{A20)}$$

and $$q_0 = (\omega/c)(2c_1)^{-\frac{1}{2}}\left(\hat{R}_-^{-\frac{1}{2}} - \hat{R}_+^{-\frac{1}{2}}\right)\Delta^{-\frac{1}{4}} \tag{A21}$$

[see (A4)-(A6) and (A19)].

In the regime of validity of (A8) and (A9), where $\Delta$ is much smaller than $$(\hat{r}_p^2\hat{r}^2-1)^{\frac{1}{2}},$$

the leading terms in the expressions for $\hat{R}_\pm$, $c_1$, $p_0$ and $q_0$ are $$\hat{R}_\pm = (\hat{r}_p^2\hat{r}^2-1)^{\frac{1}{2}} \pm (\hat{r}_p^2\hat{r}^2-1)^{-\frac{1}{2}}\Delta^{\frac{1}{2}} + O(\Delta), \tag{A22}$$

$$c_1 = 2^{-\frac{1}{3}}(\hat{r}_p^2\hat{r}^2-1)^{-\frac{1}{2}}\Delta^{\frac{1}{2}} + O(\Delta), \tag{A23}$$

$$p_0 = 2^{\frac{1}{3}}(w/c)(\hat{r}^2\hat{r}_p^2-1)^{-\frac{1}{2}} + O\left(\Delta^{\frac{1}{2}}\right), \tag{A24}$$

and $$q_0 = 2^{-\frac{1}{3}}(w/c)(\hat{r}^2\hat{r}_p^2-1)^{-1} + O\left(\Delta^{\frac{1}{2}}\right). \tag{A25}$$

These may be obtained by using (9) to express $\hat{z}$ everywhere in (10), (11) and (A2) in terms of $\Delta$ and $\hat{r}$, and expanding the resulting expressions in powers of $$\Delta^{\frac{1}{2}}.$$

The quantity $\Delta$ in turn has the following value at points $$0 \le \hat{z}_c - \hat{z} \ll (\hat{r}_p^2-1)^{\frac{1}{2}}(\hat{r}^2-1)^{\frac{1}{2}}:$$

$$\Delta = 2(\hat{r}_p^2-1)^{\frac{1}{2}}(\hat{r}^2-1)^{\frac{1}{2}}(\hat{z}_c-\hat{z}) + O[(\hat{z}_c-\hat{z})^2], \tag{A26}$$

in which $\hat{z}_c$ is given by the expression with the plus sign in (12b).

For an observation point in the far zone ($\hat{r}_P$>>1)the above expressions reduce to $$\hat{R}_{\pm} \simeq \hat{r}\hat{r}p,\ c_1 \simeq 2^{\frac{1}{6}}(\hat{r}\hat{r}p)^{-\frac{1}{2}}\left(1-\hat{r}^{-2}\right)^{\frac{1}{4}}(\hat{z}_c-\hat{z})^2, \tag{A27}$$

$$\Delta \simeq 2\hat{r}p\left(\hat{r}^2-1\right)^{\frac{1}{2}}(\hat{z}_c-\hat{z}), \tag{A28}$$

$$p_0 \simeq 2^{\frac{1}{3}}(\omega/c)(\hat{r}p\hat{r})^{-1},\ q_0 \simeq 2^{-\frac{1}{3}}(\omega/c)(\hat{r}p\hat{r})^{-2}, \tag{A29}$$

and $$X \simeq 3\left(\frac{1}{2}\hat{r}\hat{r}p\right)^{\frac{3}{2}}\left(1-\hat{r}^{-2}\right)^{-\frac{3}{4}}(\phi-\phi_c)\Big/(\tilde{z}_c-\tilde{z})^{\frac{3}{2}}, \tag{A30}$$

in which $\hat{z}_c - \hat{z}$ has been assumed to be finite.

Evaluation of the other Green's functions, $G_1$, $G_2$ and $G_3$, entails calculations which have many steps in common with that of $G_0$. Since the integrals in (34), (42) and (52) differ from that in (16) only in that their integrands respectively contain the extra factors $\hat{n}$, $\hat{e}_\varphi$ and $\hat{n}\times\hat{e}_\varphi$, they can be rewritten as integrals of the form (A3) in which the functions $$f_1(v) \equiv \hat{n}f_0,\ f_2(v) \equiv \hat{e}_\varphi f_0 \text{ and } f_3(v) \equiv \hat{n}\times\hat{e}_\varphi f_0 \tag{A31}$$

replace the $f_0(v)$ given by (A4).

If $p_0$ and $q_0$ are correspondingly replaced, in accordance with (A5) and (A6), by $$p_k = \frac{1}{2}(f_k\,|_{v=c_1} + f_k\,|_{v=-c_1}),\ k=1,2,3, \tag{A32}$$

and $$q_k = \frac{1}{2}c_1^{-1}(f_k\,|_{v=c_1} - f_k\,|_{v=-c_1}),\ k=1,2,3 \tag{A33}$$

then every step of the analysis that led from (A7) to (A8) and (A9) would be equally applicable to the evaluation of $G_k$. It follows, therefore, that $$G_k^{in} \sim 2c_1^{-2}(1-\chi^2)^{-\frac{1}{2}}\left[p_k\cos\left(\frac{1}{3}\arcsin\chi\right) - c_1 q_k \sin\left(\frac{2}{3}\arcsin\chi\right)\right],\quad |\chi|<1, \tag{A34}$$

and $$G_k^{out} \sim c_1^{-2}(\chi^2-1)^{-\frac{1}{2}}\left[p_k\sinh\left(\frac{1}{3}\operatorname{arccosh}|\chi|\right) + c_1 q_k \operatorname{sgn}(\chi)\sinh\left(\frac{2}{3}\operatorname{arccosh}|\chi|\right)\right],\quad |\chi|>1, \tag{A35}$$

constitute the uniform asymptotic approximations to the functions $G_k$ inside and outside the bifurcation surface (the envelope) $|x|=1$.

Explicit expressions for $p_k$ and $q_k$ as functions of (r, z) may be found from (8), (A19), and (A31)-(A33) jointly. The result is $$\begin{matrix} p_1 \\ q_1 \end{matrix} = 2^{-\frac{1}{2}}(\omega/c)c_1^{\pm\frac{1}{2}}\Delta^{-\frac{1}{4}} \left\{\left\{(\hat{r}_p-\hat{r}_p^{-1})\left(\hat{R}_-^{-\frac{3}{2}} \pm \hat{R}_+^{-\frac{3}{2}}\right) - \hat{r}_p^{-1}\Delta^{\frac{1}{2}}\left(\hat{R}_-^{-\frac{3}{2}} \mp \hat{R}_+^{-\frac{3}{2}}\right)\right]\hat{e}_{rp} + \hat{r}_P^{-1}\left(\hat{R}_-^{-\frac{1}{2}} \pm \hat{R}_+^{-\frac{1}{2}}\right)\hat{e}_{\varphi p} + (\hat{z}_p-\hat{z})\left(\hat{R}_-^{-\frac{3}{2}} \pm \hat{R}_+^{-\frac{3}{2}}\right)\hat{e}_{z_p}\right\}, \tag{A36}$$

-continued $$\begin{matrix} p_2 \\ q_2 \end{matrix} = 2^{-\frac{1}{2}}(\omega/c)(\hat{r}\hat{r}p)^{-1}c_1^{\pm\frac{1}{2}}\Delta^{-\frac{1}{4}} \left\{\left(\hat{R}_-^{\frac{1}{2}} \pm \hat{R}_+^{\frac{1}{2}}\right)\hat{e}_{rp} + \left[\hat{R}_-^{-\frac{1}{2}} \pm \hat{R}_+^{-\frac{1}{2}} + \Delta^{\frac{1}{2}}\left(\hat{R}_-^{-\frac{1}{2}} \mp \hat{R}_+^{-\frac{1}{2}}\right)\right]\hat{e}_{\varphi p}\right\}, \tag{A37}$$

and $$\begin{matrix} p_3 \\ q_3 \end{matrix} = 2^{-\frac{1}{2}}(\omega/c)(\hat{r}\hat{r}p)^{-1}c_1^{\pm\frac{1}{2}}\Delta^{-\frac{1}{4}} \left\{-(\hat{z}_p-\hat{z})\left[\hat{R}_-^{-\frac{3}{2}} \pm \hat{R}_+^{-\frac{3}{2}} + \Delta^{\frac{1}{2}}\left(\hat{R}_-^{-\frac{3}{2}} \mp \hat{R}_+^{-\frac{3}{2}}\right)\right]\hat{e}_{rp} + (\hat{z}_p-\hat{z})\left(\hat{R}_-^{-\frac{1}{2}} \pm \hat{R}_+^{-\frac{1}{2}}\right)\hat{e}_{\varphi_p} + \hat{r}_p\left[\Delta^{\frac{1}{2}}\left(\hat{R}_-^{-\frac{3}{2}} \mp \hat{R}_+^{-\frac{3}{2}}\right) - \left(\hat{r}^2-1\right)\left(\hat{R}_-^{-\frac{3}{2}} \pm \hat{R}_+^{-\frac{3}{2}}\right)\right]\hat{e}_{zp}\right\}, \tag{A38}$$

where use has been made of the fact $\hat{e}_{\varphi=}$_$\sin(\varphi-\varphi_P)\hat{e}_{r\ p}+\cos(\varphi-\varphi_P)\hat{e}_{\varphi t}$. Here, the expressions with the upper signs yield the $p_k$ and those with the lower signs the $q_k$.

The asymptotic value of each $G_k^{out}$ is indeterminate on the bifurcation surface (the envelope). If we expand the numerator of (A35) in powers of its denominator and cancel out the common factor $$(x^2-1)\,|^{\frac{1}{2}}$$

prior to evaluating the ratio in this equation, we obtain $$G_k^{out}|_{\varphi=\varphi\pm} = G_k^{out}|_{X=\pm1} \sim (p_k \pm 2c_1 q_k)/(3c_1^2). \tag{A39}$$

This shows that $G_k^{out}|_{\varphi=\varphi-}$ and $G_k^{out}|_{\varphi=\varphi+}$ remain different even in the limit where the surfaces $\varphi=\varphi_-$ and $\varphi=\varphi_+$ coalesce. The coefficients $q_k$ that specify the strengths of the discontinuities $$G_k^{out}\Big|_{\phi=\phi_+} - G_k^{out}\Big|_{\phi=\phi_-} \sim \frac{4}{3}q_k/c_1 \tag{A40}$$

reduce to $$q_1 \simeq \frac{3}{2^{\frac{1}{3}}}(\omega/c)(\hat{r}\hat{r}p)^{-3}\left[\left(1-\frac{2}{3}\hat{r}^2\right)\hat{r}p\hat{e}_{rp} + (\hat{z}_p-\hat{z})\hat{e}_{zp}\right], \tag{A41}$$

$$q_2 \simeq 2^{\frac{2}{3}}(\omega/c)(\hat{r}\hat{r}p)^{-1}\hat{e}_{\varphi p}, \tag{A42}$$

and $$q_3 \simeq -2^{\frac{2}{3}}(\omega/c)(\hat{r}\hat{r}p)^{-2}[(\hat{z}_p-\hat{z})\hat{e}_{rp} - \hat{r}p\hat{e}_{zp}] \tag{A43}$$

in the regime of validity of (A27) and (A28).

When $$0 \le \hat{z}_c - \hat{z} \ll \left(\hat{r}^2-1\right)^{\frac{1}{2}}\hat{r}p$$

the expressions (A41) and (A43) further reduce to $$q_1 \simeq \frac{3}{2^{\frac{1}{3}}}(\omega/c)(\hat{r}\hat{r}p)^{-2}n_1, \text{ and } q_3 \simeq 2^{\frac{2}{3}}(\omega/c)(\hat{r}\hat{r}p)^{-1}n_3 \tag{A44}$$

with $$n_1 \equiv \left(\hat{r}^{-1} - \frac{2}{3}\hat{r}\right)\hat{e}_{rp} - \left(1 - \hat{r}^{-2}\right)^{\frac{1}{2}}\hat{e}_{zp} \text{ and } n_3 \equiv \left(1 - \hat{r}^{-2}\right)^{\frac{1}{2}}\hat{e}_{rp} + \hat{r}^{-1}\hat{e}_{zp}, \tag{A45}$$

for in this case (12b)—with the adopted plus sign—can be used to replace $$\hat{z} - \hat{z}p \ by \ \left(\hat{r}^2 - 1\right)^{\frac{1}{2}}\hat{r}p.$$

Therefore, at least the following is claimed:

1. An apparatus for generating electromagnetic radiation, comprising:

a series of adjacent electrode pairs arranged on a common dielectric substrate, where electrodes of each electrode pair in the series of adjacent electrode pairs are substantially aligned on opposite sides of the common dielectric substrate; and electrode drive circuitry configured to:

energize a first electrode pair in the series of adjacent electrode pairs at an energizing time to produce a volume polarization distribution pattern within the common dielectric substrate;

energize a next electrode pair in the series of adjacent electrode pairs at a next energizing time to produce a variation of the volume polarization distribution pattern within the common dielectric substrate, a center of the next electrode pair located a distance from a center of the first electrode pair, wherein the next energizing time is a time interval after the energizing time of the first electrode pair, the time interval less than a time for light to travel the distance between the centers of the first and the next electrode pairs.

2. The apparatus of claim 1, wherein the electrode drive circuitry is further configured to repetitively energize a next adjacent electrode pair for subsequent electrode pairs in the series of adjacent electrode pairs to produce a continuous time-varying volume polarization distribution pattern within the common dielectric substrate.

3. The apparatus of claim 1, wherein the series of adjacent electrode pairs form a ring of electrode pairs.

4. The apparatus of claim 1, wherein the series of adjacent electrode pairs form a rectilinear configuration of electrode pairs.

5. The apparatus of claim 1, wherein a distance between centers of adjacent electrode pairs in the series of adjacent electrode pairs is constant.

6. The apparatus of claim 5, wherein the time interval between energizing times of the adjacent electrode pairs is constant or increasing.

7. The apparatus of claim 5, wherein the time interval between energizing times of the adjacent electrode pairs is decreasing.

8. The apparatus of claim 1, wherein electrode pairs of the series of adjacent electrode pairs are energized for a period of time greater than the time interval.

9. The apparatus of claim 1, wherein electrode pairs of the series of adjacent electrode pairs are energized at a modulated voltage level.

10. The apparatus of claim 2, wherein the electrode drive circuitry is further configured to:

energize the first electrode pair at a new energizing time; and repetitively energize the next electrode pair for subsequent electrode pairs in the series of adjacent electrode pairs.

11. The apparatus of claim 10, wherein the series of adjacnet electrode pairs form a ring of electrode pairs, a center of a last electrode pair of the series of adjacent electrode pais located a distance from the center of the first electrode pair.

12. The apparatus of claim 11, wherein the ring of electrode pairs is continuous.

13. The apparatus of claim 11, wherein the new energizing time is a time interval after the energizing time of the last electrode pair of the series of adjacent electrode pairs, the time interval less than a time for light to travel the distance between the centers of the last electrode pair and the first electrode pair.

14. The apparatus of claim 1, wherein the volume polarization distribution pattern is a volume distribution pattern of polarization current.

15. The apparatus of claim 1, wherein the volume polarization distribution pattern is a volume distribution pattern of polarization charge.

* * * * *